(12) United States Patent  
Inoue

(10) Patent No.: US 9,473,694 B2
(45) Date of Patent: Oct. 18, 2016

(54) IMAGE PROCESSING DEVICE, IMAGING DEVICE, IMAGE PROCESSING METHOD AND COMPUTER READABLE MEDIUM

(71) Applicant: FUJIFILM Corporation, Tokyo (JP)

(72) Inventor: Kazuki Inoue, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/741,093

(22) Filed: Jun. 16, 2015

(65) Prior Publication Data

US 2015/0281560 A1 Oct. 1, 2015

Related U.S. Application Data

(63) Continuation of application No. PCT/JP2013/078728, filed on Oct. 23, 2013.

(30) Foreign Application Priority Data

Dec. 19, 2012 (JP) ................................ 2012-277007

(51) Int. Cl.
*G03B 13/00* (2006.01)
*H04N 5/232* (2006.01)
(Continued)

(52) U.S. Cl.
CPC ...... *H04N 5/23212* (2013.01); *H04N 5/23222* (2013.01); *H04N 5/23293* (2013.01); *H04N 5/3696* (2013.01); *G02B 7/34* (2013.01); *G03B 13/36* (2013.01); *G03B 17/18* (2013.01)

(58) Field of Classification Search
CPC ........... H04N 5/23212; H04N 5/3696; H04N 5/23222; H04N 5/23293

USPC .......................................... 348/345, 349–351
See application file for complete search history.

(56) References Cited

U.S. PATENT DOCUMENTS 7,110,040 B1 9/2006 Misawa
9,204,067 B2 * 12/2015 Onuki ................ H04N 5/23212
(Continued)

FOREIGN PATENT DOCUMENTS

JP 4-145420 A 5/1992
JP 7-15648 A 1/1995
(Continued)

OTHER PUBLICATIONS

International Search Report, issued in PCT/JP2013/078728, dated Feb. 4, 2014.
(Continued)

*Primary Examiner* — Ngoc-Yen Vu
(74) *Attorney, Agent, or Firm* — Birch, Stewart, Kolasch & Birch, LLP

(57) ABSTRACT

An image processing device comprising: a determination section that, based on a factor defining a depth representing a permissible range for acceptable state of focus and on parallax computed by a parallax computation section, determines an operation movement ratio for converting an operation amount, that instructs movement of a focusing lens, into a movement amount of the focusing lens by using a function including the operation movement ratio as a dependent variable and an independent variable determined according to the factor and the parallax; and a control section that controls a movement section to move the focusing lens by an amount equivalent to a movement amount determined based on an operation movement ratio determined by the determination section and the operation amount.

14 Claims, 31 Drawing Sheets

(51) Int. Cl.
*H04N 5/369* (2011.01)
*G02B 7/34* (2006.01)
*G03B 13/36* (2006.01)
*G03B 17/18* (2006.01)

(56) References Cited

U.S. PATENT DOCUMENTS

| | | |
|---|---|---|
| 2004/0184795 A1 | 9/2004 | Okawara |
| 2006/0187320 A1 | 8/2006 | Misawa |
| 2009/0153720 A1 | 6/2009 | Suzuki et al. |
| 2009/0273702 A1 | 11/2009 | Okawara |
| 2012/0019701 A1 | 1/2012 | Misawa |
| 2013/0329120 A1* | 12/2013 | Hiasa ................ H04N 5/23212 348/345 |
| 2014/0071305 A1* | 3/2014 | Hiasa ................ H04N 5/23212 348/218.1 |
| 2015/0181194 A1* | 6/2015 | Izawa ................ G02B 7/34 348/49 |
| 2015/0249782 A1* | 9/2015 | Fukuda ............. H04N 5/23212 348/222.1 |

FOREIGN PATENT DOCUMENTS

| | | |
|---|---|---|
| JP | 7-84173 A | 3/1995 |
| JP | 11-289484 A | 10/1999 |
| JP | 2004-287038 A | 10/2004 |
| JP | 2007-108584 A | 4/2007 |
| JP | 2009-147665 A | 7/2009 |
| JP | 2009-163220 A | 7/2009 |

OTHER PUBLICATIONS

Written Opinon of the International Searching Authority, issued in PCT/JP2013/078728, dated Feb. 4, 2014.

* cited by examiner

α:   COEFFICIENT FOR CONVERTING TO UNITS
     OF OPERATION MOVEMENT RATIO
f (β, D): COEFFICIENT CONSIDERING DEPTH AND PARALLAX
β:   FACTOR DETERMINING DEPTH
     (VALUE TO SPECIFY POSITION OF FOCUSING LENS)

α: COEFFICIENT FOR CONVERTING TO UNITS OF OPERATION MOVEMENT RATIO
β: FACTOR DETERMINING DEPTH

α: COEFFICIENT FOR CONVERTING
   TO UNITS OF OPERATION MOVEMENT RATIO
β: FACTOR DETERMINING DEPTH

α: COEFFICIENT FOR CONVERTING
   TO UNITS OF OPERATION MOVEMENT RATIO
f (β, D): COEFFICIENT CONSIDERING DEPTH AND PARALLAX
β: FACTOR DETERMINING DEPTH

γ: COEFFICIENT FOR CONVERTING TO UNITS OF RESISTANCE FORCE
f (β, D): COEFFICIENT CONSIDERING DEPTH AND PARALLAX

IMAGE PROCESSING DEVICE, IMAGING DEVICE, IMAGE PROCESSING METHOD AND COMPUTER READABLE MEDIUM

CROSS-REFERENCE TO RELATED APPLICATIONS

This application is a continuation application of International Application No. PCT/JP2013/078728, filed Oct. 23, 2013, the disclosure of which is incorporated herein by reference in its entirety. Further, this application claims priority from Japanese Patent Application No. 2012-277007, filed Dec. 19, 2012, the disclosure of which is incorporated herein by reference in its entirety.

BACKGROUND

1. Technical Field

The present invention relates to an image processing device, an imaging device, an image processing method, and a computer readable medium.

2. Background Art

Digital cameras are widely known that are provided with autofocus, in which phase difference detection methods and contrast detection methods are employed, and also what is referred to as a manual focus mode, in which a user can manually perform focus adjustment.

Digital cameras including a manual focus mode are known in which a reflex mirror is provided to enable focus adjustment while checking a subject-image, and a method is utilized in which a split microprism screen is employed to display the phase difference visually. Utilization of a method in which contrast is checked visually is also known.

However, in digital cameras with the reflex mirror omitted that have become prevalent in recent years, since there is no reflex mirror, there is no method to check the subject-image while displaying the phase difference, and contrast detection methods have had to be relied on. However, in such cases, contrast cannot be displayed at a resolution greater than that of a display device, such as a Liquid Crystal Display (LCD), requiring adoption of methods such as enlarging a portion for display.

In recent years, therefore, a split-image is displayed within a live-view image (also referred to as a through image), so as to make the work of focusing on the subject-image easier for an operator when in manual focus mode. Split-image refers to a divided image in which, for example, a display region has been divided into plural sections (such as each image divided in the up-down direction), and in which displacement is imparted in the parallax generation direction (such as the left-right direction) according to focus misalignment, and is a divided image in which the displacement in the parallax generation direction disappears in an in-focus state. The operator (such as a photographer) operates a manual focus ring (hereafter referred to as a "focus ring") to match the focus so that displacement of the split-image (such as each image divided in the up-down direction) is removed.

In the imaging device described in JP-A No. 2009-147665 (referred to below as "Patent Document 1"), out of light rays from an imaging optical system, a first subject-image and a second subject-image formed by light rays divided by a pupil divider are photoelectrically converted to generate a first image and a second image, respectively. The first and the second images are employed to generate a split-image, and a third subject-image formed by the light rays not divided by the pupil divider is photoelectrically converted to generate a third image. The third image is displayed on a display section and the generated split-image is displayed inside the third image, and color data extracted from the third image is applied to the split-image. By applying color data extracted from the third image to the split-image in this way, excellent visibility of the split-image can be achieved.

An imaging device described in JP-A No. H07-15648 (referred to below as Patent Document 2) includes a manual focus function, and determines the movement speed of a focusing lens that is moveable along the optical axis direction according to the subject depth of field.

An imaging device described in JP-A No. 2007-108584 (referred to below as Patent Document 3) includes a focal point adjustment mechanism that, coupled to manual operation, adjusts to move a focusing lens to the in-focus position. The focal point adjustment mechanism in this imaging device controls such that the movement speed of the focusing lens is slow with respect to an image pick-up device in cases in which a focus evaluation value of an imaging lens is high, and the movement speed of the focusing lens is fast in cases in which the focus evaluation value is low.

Technical Problem

However, the technology in all of the Patent Documents 1 to 3 still has the issue that the focusing lens is not able to be moved with high precision to the in-focus position quickly.

SUMMARY

In consideration of the above circumstances, an object of the present invention is to provide an image processing device, an imaging device, an image processing method and a computer readable medium capable of moving the focusing lens with high precision to the in-focus position quickly.

In order to achieve the above object, an image processing device according to the first exemplary embodiment of the present invention includes: an image acquisition section that acquires first and second images based on first and second image signals output from an image pick-up device including first and second pixel groups outputting the first and second image signals due to respective images being formed by a pupil-divided subject-image that has passed through first and second regions of an imaging lens including a focusing lens that is moveable along an optical axis direction; a movement section that moves the focusing lens in the optical axis direction; a parallax computation section that computes parallax indicating a displacement amount between each pixel in the first image acquired by the image acquisition section and respective corresponding pixels in the second image acquired by the image acquisition section; a determination section that, based on a factor defining a depth representing a permissible range for acceptable state of focus and on parallax computed by the parallax computation section, determines an operation movement ratio for converting an operation amount instructing movement of the focusing lens into a movement amount of the focusing lens using a function including the operation movement ratio as a dependent variable and an independent variable determined according to the factor and the parallax; a control section that performs control on the movement section to move the focusing lens by an amount equivalent to a movement amount determined based on an operation movement ratio determined by the determination section and the operation amount; a generation section that generates a first display image based on an image signal output from the image pick-up device, and generates a second display image for use in focus verification based on the first and second images; a display section that displays images; and a display controller that performs control to display the first display image generated by the generation section on the display section, and to display the second display image generated by the generation section within a display region of the first display image. This thereby enables high precision movement of the focusing lens to the in-focus position to be performed quicker than in cases lacking the present configuration.

In order to achieve the above objective, an image processing device according to a second aspect of the present invention includes: an image acquisition section that acquires first and second images based on first and second image signals output from an image pick-up device including first and second pixel groups outputting the first and second image signals due to respective images being formed by a pupil-divided subject-image that has passed through first and second regions of an imaging lens including a focusing lens that is moveable along an optical axis direction; a movement section that moves the focusing lens in the optical axis direction; a parallax computation section that computes parallax indicating a displacement amount between each pixel in the first image acquired by the image acquisition section and respective corresponding pixels in the second image acquired by the image acquisition section; a determination section that, based on a factor defining a depth representing a permissible range for acceptable state of focus and on parallax computed by the parallax computation section, determines an operation movement ratio for converting an operation amount instructing movement of the focusing lens into a movement amount of the focusing lens using a function including the operation movement ratio as a dependent variable and an independent variable determined according to the factor and the parallax; a control section that performs control on the movement section to move the focusing lens by an amount equivalent to a movement amount determined based on an operation movement ratio determined by the determination section and the operation amount; a generation section that generates a first display image based on an image signal output from the image pick-up device, and generates a second display image for use in focus verification based on the first and second images; a display section that displays images; and a display controller that performs control to inhibit display by the display section of the first display image generated by the generation section, and to display on the display section the second display image generated by the generation section. This thereby enables high precision movement of the focusing lens to the in-focus position to be performed quicker than in cases lacking the present configuration.

A third aspect of the present invention is the first aspect or the second aspect of the present invention, wherein the operation movement ratio is larger the larger the depth determined by the factor. This thereby enables the operation movement ratio to be determined with higher precision than in cases lacking the present configuration.

A fourth aspect of the present invention is any one of the first aspect to the third aspect of the present invention, wherein, during an interval in which the parallax exceeds a specific value, the control section further performs control on the movement section to move the focusing lens by an amount equivalent to a movement amount determined based on a predetermined value for the maximum value of the operation movement ratio and based on the operation amount. This thereby enables the movement time of the focusing lens to the in-focus position to be made shorter than in cases lacking the present configuration, even in cases in which the parallax exceeds the specific value.

A fifth aspect of the present invention is the fourth aspect of the present invention, wherein, during an interval in which the parallax is in an undetectable state, the control section performs control on the movement section to move the focusing lens by an amount equivalent to a movement amount determined based on a predetermined value for the maximum value of the operation movement ratio and based on the operation amount. This thereby enables the movement time of the focusing lens to the in-focus position to be made shorter than in cases lacking the present configuration, even in cases in which the parallax is in an undetectable state.

A sixth aspect of the present invention is any one of the first to the fifth aspects of the present invention, wherein the factor is determined based on at least one item selected from the group consisting of data representing the current position of the focusing lens on the optical axis, an aperture number, a subject distance, a focal point distance, and a size of a permissible circle of confusion. This thereby enables, using a simple configuration, the operation movement ratio to be determined at higher precision than in case lacking the present configuration.

A seventh aspect of the present invention is any one of the first aspect to the sixth aspect of the present invention, wherein: the image pick-up device further includes a third pixel group, on which an image of a subject-image that has passed through the imaging lens is formed without being pupil-divided, and that outputs a third image signal; and the generation section generates the first display image based on the third image signal output from the third pixel group. This thereby enables, using a simple configuration, the quality of the first display image to be improved compared to cases lacking the present configuration.

An eighth aspect of the present invention is any one of the first to the seventh aspects of the present invention, further including a detection section that detects a contact operation to an operation screen, and an operation amount determination section that determines the operation amount based on the contact operation detected by the detection section during a movement instruction period for instructing movement of the focusing lens. This thereby enables the operation amount to be determined with a simpler configuration than in cases lacking the present configuration.

In order to achieve the above object, the imaging device according to a ninth aspect of the present invention includes the image processing device of any one of the first aspect to the eighth aspect of the present invention, an image pick-up device including the first and second pixel groups, and a storage section that stores images generated based on image signals output from the image pick-up device. This thereby enables high precision movement of the focusing lens to the in-focus position to be performed more quickly than in a case lacking the present configuration.

In order to achieve the above object, an image processing method according to a tenth aspect of the present invention includes: acquiring first and second images based on first and second image signals output from an image pick-up device including first and second pixel groups outputting the first and second image signals due to respective images being formed by a pupil-divided subject-image that has passed through first and second regions of an imaging lens including a focusing lens that is moveable along an optical axis direction; computing parallax indicating a displacement amount between each pixel in the acquired first image and respective corresponding pixels in the acquired second image; determining, based on a factor defining a depth representing a permissible range for acceptable state of focus and on computed parallax, an operation movement ratio for converting an operation amount instructing movement of the focusing lens into a movement amount of the focusing lens using a function including the operation movement ratio as a dependent variable and an independent variable determined according to the factor and the parallax; performing control on a movement section to move the focusing lens by an amount equivalent to a movement amount determined based on a determined operation movement ratio and based on the operation amount; generating a first display image based on an image signal output from the image pick-up device; generating a second display image for use in focus verification based on the first and second images; and performing control to display the generated first display image on a display section for displaying images, and to display the generated second display image within a display region of the first display image. This thereby enables high precision movement of the focusing lens to the in-focus position to be performed quicker than in cases lacking the present configuration.

In order to achieve the above object, an image processing method of an eleventh aspect of the present invention includes: acquiring first and second images based on first and second image signals output from an image pick-up device including first and second pixel groups outputting the first and second image signals due to respective images being formed by a pupil-divided subject-image that has passed through first and second regions of an imaging lens including a focusing lens that is moveable along an optical axis direction; computing parallax indicating a displacement amount between each pixel in the acquired first image and respective corresponding pixels in the acquired second image; determining, based on a factor defining a depth representing a permissible range for acceptable state of focus and on computed parallax, an operation movement ratio for converting an operation amount instructing movement of the focusing lens into a movement amount of the focusing lens using a function including the operation movement ratio as a dependent variable and an independent variable determined according to the factor and the parallax; performing control on the movement section to move the focusing lens by an amount equivalent to a movement amount determined based on a determined operation movement ratio and based on the operation amount; generating a first display image based on an image signal output from the image pick-up device; generating a second display image for use in focus verification based on the first and second images; and performing control to inhibit display by a display section of the generated first display image, and to display on the display section the generated second display image. This thereby enables high precision movement of the focusing lens to the in-focus position to be performed quicker than in cases lacking the present configuration.

In order to achieve the above object, an image processing program according to a twelfth aspect of the present invention causes a computer to function as the image acquisition section, the parallax computation section, the determination section, the control section, the generation section, and the display control section of the image processing device of any one of the first aspect to the eight aspect. This thereby enables high precision movement of the focusing lens to the in-focus position to be performed quicker than in cases lacking the present configuration.

Advantageous Effects of Invention

The present invention is able to obtain the advantageous effect of enabling high precision movement of the focusing lens to the in-focus position to be performed quickly.

DESCRIPTION OF EMBODIMENTS

Explanation follows regarding examples of exemplary embodiments of an imaging device according to the present invention, with reference to the drawings.

First Exemplary Embodiment

Figure 1:
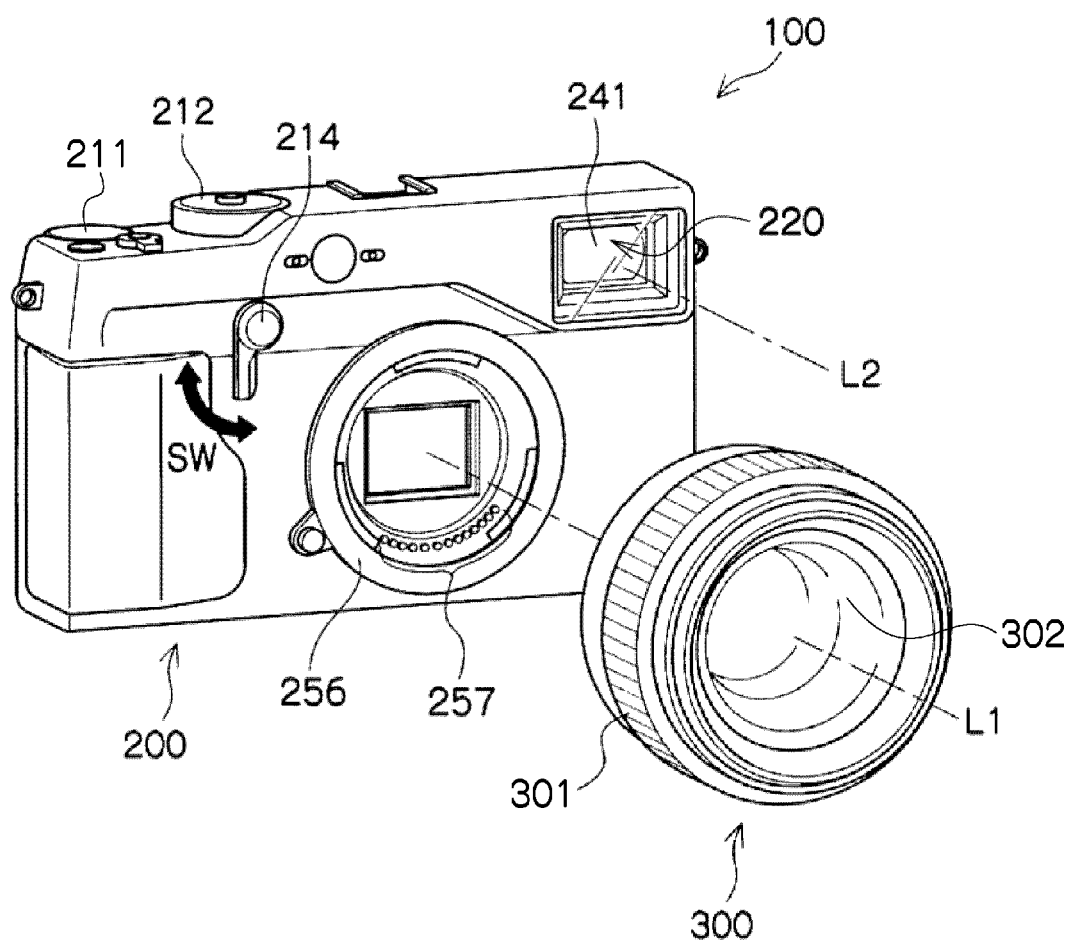
FIG. 1 is a perspective view illustrating an example of an external appearance of an interchangeable lens camera that is an imaging device according to a first exemplary embodiment.
Figure 2:
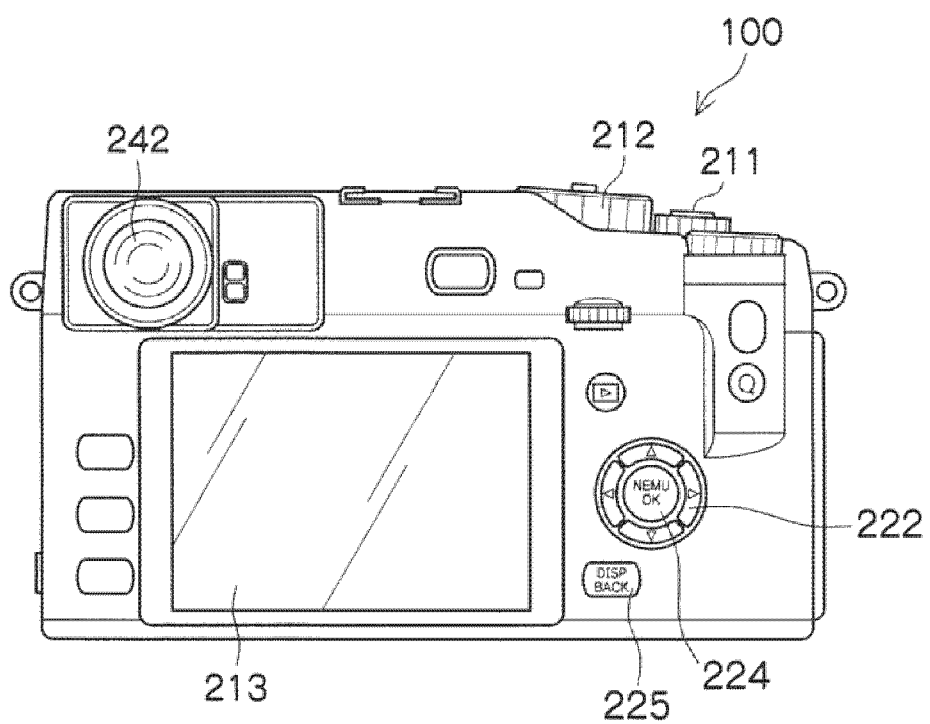
FIG. 2 is a back view illustrating the back face side of the imaging device illustrated in FIG. 1.

FIG. 1 is a perspective view illustrating an example of an external appearance of an imaging device 100 according to a first exemplary embodiment. FIG. 2 is a back view of the imaging device 100 illustrated in FIG. 1.

The imaging device 100 is an interchangeable lens camera. The imaging device 100 is a digital camera including a camera body 200 and an interchangeable lens 300 that is interchangeably mounted to the camera body 200, and without a reflex mirror. The interchangeable lens 300 includes imaging lenses 16 that include a focusing lens 302 capable of being moved along the optical axis direction by manual operation (see FIG. 3). A HYBRID FINDER (registered trademark) 220 is also provided to the camera body 200. The HYBRID FINDER 220 indicates, for example, a finder selectively employed as an optical viewfinder (referred to as "OVF" below), or as an electronic viewfinder (referred to as "EVF" below)

The interchangeable lens 300 is interchangeably mounted to the camera body 200. A focus ring 301 is provided to a mirror cylinder of the interchangeable lens 300. The focusing lens 302 is moved in the optical axis direction as the focus ring 301 is rotationally operated by hand, such that subject light forms an image on an image pick-up device 20 (see FIG. 3) at an in-focus position according to the subject distance.

An OVF finder window 241 included in the HYBRID FINDER 220 is provided on the front face of the camera body 200. A finder switching lever (finder switching section) 214 is also provided on the front face of the camera body 200. Switching (described below) is performed between an optical image visible with the OVF and an electronic image visible with the EVF (live-view image) by turning the finder switching lever 214 in the directions of the arrows SW. The optical axis L2 of the OVF is a different optical axis from the optical axis L1 of the interchangeable lens 300. The top face of the camera body 200 is mainly provided with a release switch 211 and a dial 212 to set imaging mode, replay mode, etc.

The release switch 211 serving as an imaging preparation instruction section and an imaging instruction section is configured capable of detecting two stages of press operation: a state pressed from a standby position to an intermediate position (half pressed position), and a state (imaging state) pressed to a final pressed position past the intermediate position (fully pressed position). In the following a "state pressed from the standby position to the half pressed position" is referred to as a "half pressed state", and "a state pressed from the standby position to the fully pressed position" is referred to as the "fully pressed state".

In the imaging device 100 according to the first exemplary embodiment, adjustment of imaging conditions is performed by placing the release button 211 in the half pressed state, and then light exposure (imaging) is performed by continuing to the fully pressed state. Herein, "imaging conditions" refers to at least one out of, for example, exposure state or focusing state. In the imaging device 100 according to the first exemplary embodiment, adjustment is performed on the exposure state and the focusing state. Namely, after actuating an Automatic Exposure (AE) function by placing the release button 211 in the half pressed state to set the exposure state (shutter speed and aperture state), an Auto Focus (AF) function is then actuated to control focus.

The back face of the camera body 200 is provided with an OVF finder eyepiece 242, a display section 213, a directional pad 222, a MENU/OK key 224, and a BACK/DISP button 225.

The directional pad 222 functions as a multifunction key to output various instruction signals, such as selection of one or plural menus, zoom, and frame advance. The MENU/OK key 224 is an operation key that functions as a menu button to instruct display of one or plural menus on the screen of the display section 213, and also doubles to function as an OK button to confirm selected content, to instruct execution, or the like. The BACK/DISP button 225 is used when erasing a desired object, such as a selected item, erasing specified content, or returning to the one-previous operation state, and so on.

The display section 213 is implemented for example by an LCD, and is employed to display a live-view image (through image) that is an example of successive frame images obtained by imaging successive frames during the imaging mode. The display section 213 is also employed to display a still image that is an example of a single frame image obtained by imaging a single frame in cases in which an instruction for still image capture has been given. Moreover, the display section 213 may be employed to display a reproduced image in a reproduction mode, and to display a menu screens and the like.

Figure 3:
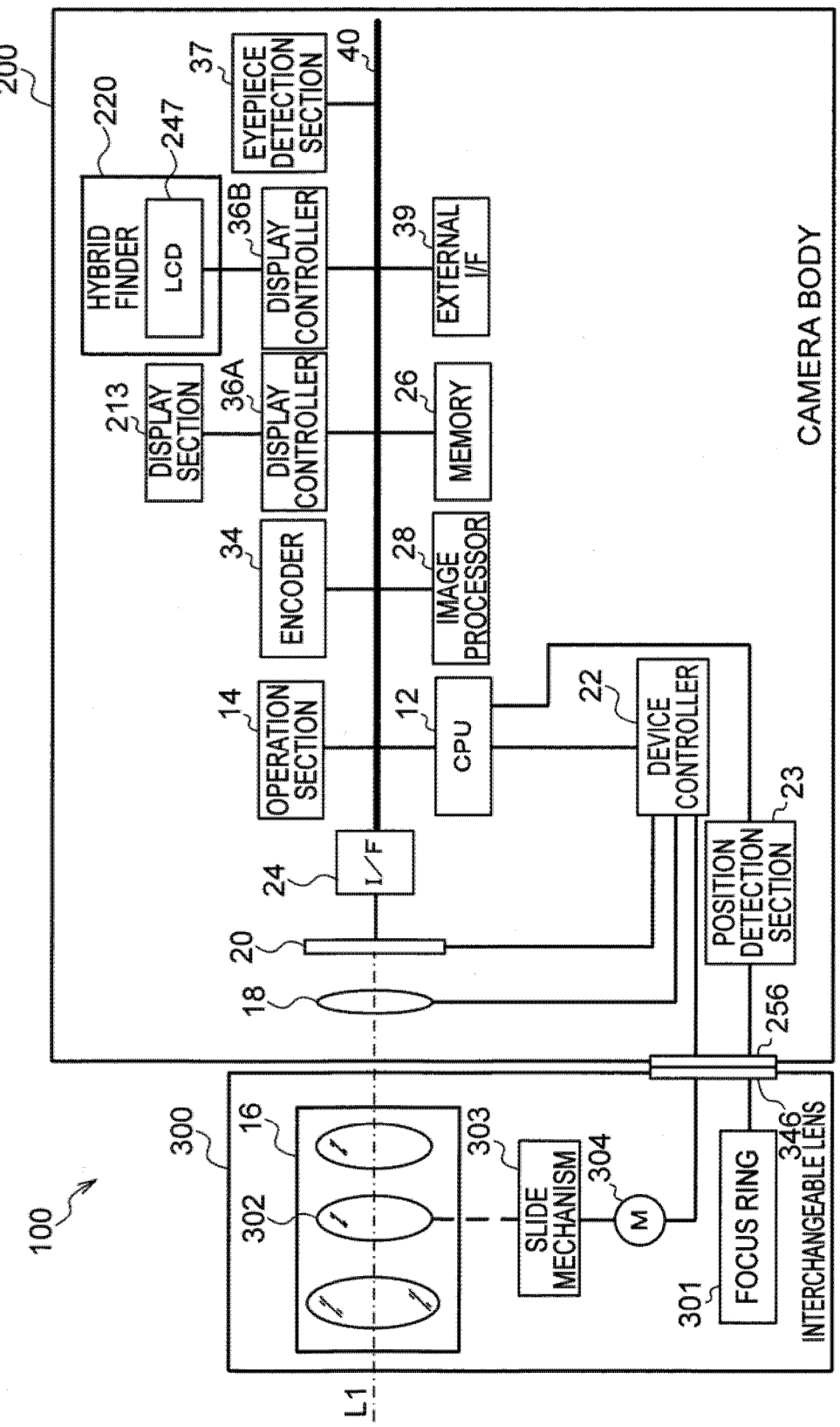
FIG. 3 is a block diagram illustrating an example of a configuration of an electrical system of an imaging device according to the first exemplary embodiment.

FIG. 3 is a block diagram illustrating an example of a configuration (internal configuration) of an electrical system of the imaging device 100 according to the first exemplary embodiment.

The imaging device 100 includes a mount 256 provided to the camera body 200, and a mount 346 on the interchangeable lens 300 side that corresponds to the mount 256. The interchangeable lens 300 is interchangeably mounted to the camera body 200 by connecting the mount 346 to the mount 256.

The interchangeable lens 300 includes a slide mechanism 303 and a motor 304 that are an example of a movement section according to the present invention. The slide mechanism 303 moves the focusing lens 302 along the optical axis L1 direction by operation of the focus ring 301. The focusing lens 302 is attached to the slide mechanism 303 so as to be capable of sliding in the optical axis L1 direction. The motor 304 is connected to the slide mechanism 303, and the slide mechanism 303 slides the focusing lens 302 along the optical axis L1 direction on receipt of motive force from the motor 304.

The motor 304 is connected to the camera body 200 through the mounts 256, 346, and driving is controlled under instruction from the camera body 200. In the first exemplary embodiment a stepping motor is employed as an example of the motor 304. The motor 304 operates in synchronization with pulse power under command from the camera body 200.

The imaging device 100 is a digital camera that records still images and video images that have been imaged. Overall operation of the camera is controlled by a central processing unit (CPU) 12. The imaging device 100 includes the CPU 12 as an example of a determination section and a control section of the present invention. The imaging device 100 includes an operation section 14, an interface section 24, memory 26, and an encoder 34. The imaging device 100 includes display control sections 36A, 36B that are examples of display controllers according to the present invention. The imaging device 100 includes an eyepiece detection section 37. The imaging device 100 also includes an image processor 28 that is an example of an image acquisition section, a parallax computation section, and a generation section according to the present invention. When there is no need to discriminate between the display control sections 36A, 36B, they are referred to below as "display control section 36". In the first exemplary embodiment, the display control section 36 is provided as a separate hardware configuration to the image processor 28, however there is no limitation thereto. The image processor 28 may include a function similar to that of the display control section 36, and in such cases the display control section 36 is not required.

The CPU 12, the operation section 14, the interface section 24, the memory 26 that is an example of a storage section, the image processor 28, the encoder 34, the display control sections 36A, 36B, the eyepiece detection section 37, and an external interface (I/F) 39 are connected together through a bus 40. The memory 26 includes a non-volatile storage region (for example EEPROM or the like) stored with parameters, programs, and the like, and a volatile storage region (for example SDRAM or the like) temporarily stored with various data such as images and the like.

In the imaging device 100 according to the first exemplary embodiment, the CPU 12 performs focusing control by controlling the driving of a focus adjustment motor such that a contrast value of the image obtained by imaging becomes a maximum. The CPU 12 computes AE data that is a physical amount indicating the brightness of the image obtained by imaging. When the release switch 211 is in the half pressed state, the CPU 12 derives the shutter speed and the F number according to the brightness of the image indicated by the AE data. The exposure state is then set by controlling the relevant sections such that the derived shutter speed and F number are achieved.

The operation section 14 is a user interface operated by an operator when giving various instructions to the imaging device 100. Various instructions received by the operation section 14 are output to the CPU 12 as operation signals, and the CPU 12 executes processing according to the operation signals input from the operation section 14.

The operation section 14 includes the release switch 211, the dial 212 for selecting imaging modes and the like, a display section 213, the finder switching lever 214, the directional pad 222, the MENU/OK key 224, and the BACK/DISP button 225. The operation section 14 includes a touch panel for receiving various information. The touch panel is, for example, superimposed on the display screen of the display section 213.

The camera body 200 includes a position detection section 23. The position detection section 23 is connected to the CPU 12. The position detection section 23 is connected to the focus ring 301 through the mounts 256, 346, detects the angle of rotation of the focus ring 301, and outputs rotation angle data representing the rotation angle of the detection result to the CPU 12. The CPU 12 executes processing according to rotation angle data input from the position detection section 23.

When the imaging mode has been set, image light representing a subject-image is formed as an image on a light receiving face of the color image pick-up device (for example a CMOS sensor) 20 through the imaging lenses 16 that include the focusing lens 302 that is movable by manual operation, and a shutter 18. The signal charges accumulated in the image pick-up device 20 are read in sequence as digital signals according to the signal charges (voltage) arising due to application of a read signal from a device controller 22. The image pick-up device 20 has what is referred to as an electronic shutter function, and the charge accumulation time (shutter speed) of each photosensor is controlled by the timing of the read signals by operating the electronic shutter function. The image pick-up device 20 according to the first exemplary embodiment is a CMOS image sensor, however there is no limitation thereto, and a CDD image sensor may be employed.

Figure 4:
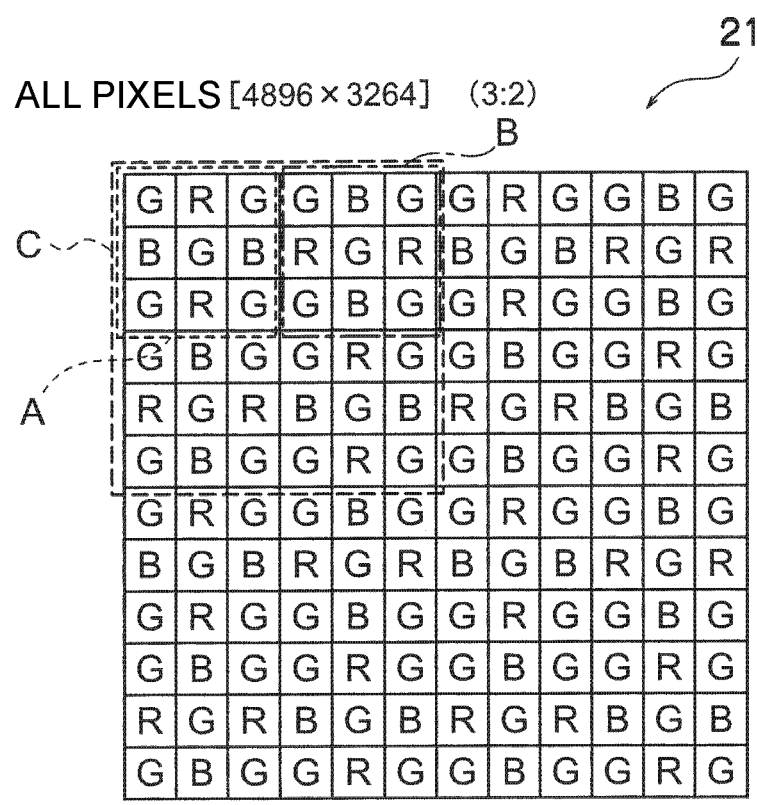
FIG. 4 is a schematic layout diagram illustrating an example of placement of a color filter provided to an image pick-up device included in an imaging device according to the first exemplary embodiment.

A color filter 21 of the example illustrated in FIG. 4 is provided to the image pick-up device 20. FIG. 4 schematically illustrates an example of an array of the color filter 21. In the example illustrated in FIG. 4, (4896×3264) pixels are employed as an example of the number of pixels, and 3:2 is applied as the aspect ratio; however, the number of pixels and the aspect ratio are not limited thereto. As in the example illustrated in FIG. 4, the color filter 21 includes a first filter G corresponding to green (G) that contributes most to obtaining the brightness signal, a second filter R corresponding to red (R), and a third filter B corresponding to blue (B). The array pattern of the first filter G (referred to below as G filter), the second filter R (referred to below as R filter), and the third filter B (referred to below as B filter) is classified into a first array pattern A and a second array pattern B.

In the first array pattern A, the G filter is placed on the 4 corner pixels and center pixel of a 3×3 pixel square array. In the first array pattern A, the R filter is placed in the vertical line at the row direction (for example the horizontal direction) center of the square array. In the first array pattern A, the B filter is placed in the horizontal line at the column direction (for example the vertical direction) center of the square array. In the second array pattern B, the placement of the filter G is the same as that of the first basic array pattern A, and the placement of the filter R and the placement of the B filter are in a swapped over pattern. The color filter 21 includes a basic array pattern C formed from a square array pattern corresponding to 6×6 pixels. The basic array pattern C is a 6×6 pixel pattern disposed with the first array pattern A and the second array pattern B so as to have point symmetry, with the basic array pattern C disposed repeating in both the row direction and the column direction. Namely, in the color filter 21 each of the color filters R, G, B (the R filter, G filter, B filter) is arrayed with a specific periodicity. This thereby enables processing to be performed according to a repeating pattern during performing synchronization (interpolation) processing and the like on the R, G, B signals read from the color image pick-up device.

Moreover, when images are reduced by thinning processing in basic array pattern C units, the color filter array of the thinning processed reduced images can be made similar to the color filter array prior to thinning processing, enabling a common processing circuit to be employed.

The color filter 21 has the G filter corresponding to the color contributing the most to obtaining a brightness signal (the color G in the first exemplary embodiment) placed in each line in the row direction, column direction and diagonal directions of the color filter array. This thereby enables the reproduction precision of synchronization processing to be raised in high frequency regions, irrespective of the high frequency direction.

The color filter 21 has the R filter and the B filter corresponding to the two or more other colors other than the G color (the R and B colors in the first exemplary embodiment) placed in each line in the row direction and column direction of the color filter array. This thereby enables color moiré (false color) generation to be suppressed, thereby enabling an optical low pass filter for suppressing false color generation to be omitted from placement on the optical path of the optical system from the incident face to the imaging plane. Moreover, even in cases in which an optical low pass filter is employed, one can be employed that has a weak action to cut the high frequency components to prevent false color generation, enabling deterioration of resolution to be avoided.

The basic array pattern C can be considered as an alternate array of the first array pattern A and the second array pattern B in the row direction and column direction, wherein the first array pattern A is the 3×3 pixels surrounded by the frame of the dashed line, and the second array pattern B is the 3×3 pixels surrounded by the frame of the dash-dotted intermittent line.

The first array pattern A and the second array pattern B both have the G filters that are the respective brightness system pixels placed at their 4 corners and center, so as to be placed along their two diagonals. Moreover, in the first array pattern A, the B filters are arrayed in the row direction on each side of the central G filter, and the R filters are arrayed in the column direction on each side of the central G filter. However, in the second array pattern B, the R filters are arrayed in the row direction on each side of the central G filter, and the B filters are arrayed in the column direction on each side of the central G filter. Namely, the first array pattern A and the second array pattern B have reverse positional relationships to each other for the R filters and the B filters, but have the same placement otherwise.

Figure 5:
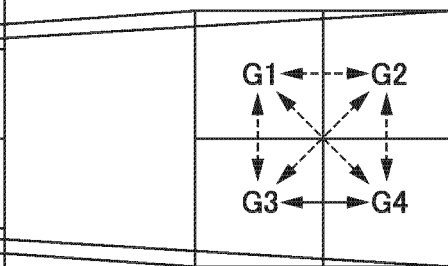
FIG. 5 a diagram for explaining a method of determining a correlation direction from pixel values of 2×2 pixels of G pixels included in the color filter illustrated in FIG. 4.

Due to the first array pattern A and the second array pattern B being alternately disposed along the row direction and the column direction, the four corner G filters of the first array pattern A and the second array pattern B form a square array of G filters corresponding to 2×2 pixels, such as the example illustrated in FIG. 5. By extracting the 2×2 pixels formed from the G filters as illustrated in the example in FIG. 5, the difference in absolute value of the pixel values of the G pixels in the row direction, the difference in absolute value of the pixel values of the G pixels in the column direction, and the difference in absolute value of the pixel values of the G pixels in the diagonal directions (sloping up to the right and sloping up to the left) are computed. Correlation can be determined in a direction having a small absolute value from out of the row direction, the column direction, and the diagonal directions. Namely, a direction having a high correlation from out of the row direction, the column direction, and the diagonal directions is discriminated using data of the G pixels with the minimum pixel separation. This discrimination result can be employed in processing to interpolate from peripheral pixels (synchronization processing).

The placement in the basic array pattern C of the color filter 21 has point symmetry about the center of the basic array pattern C (the center of the 4 G filters). Moreover, the first array pattern A and the second array pattern B inside the basic array pattern C also each have respective point symmetry about the G filters at their respective centers, enabling the circuit scale of a later stage processing circuit to be made smaller or simplified, for example.

Figure 6:
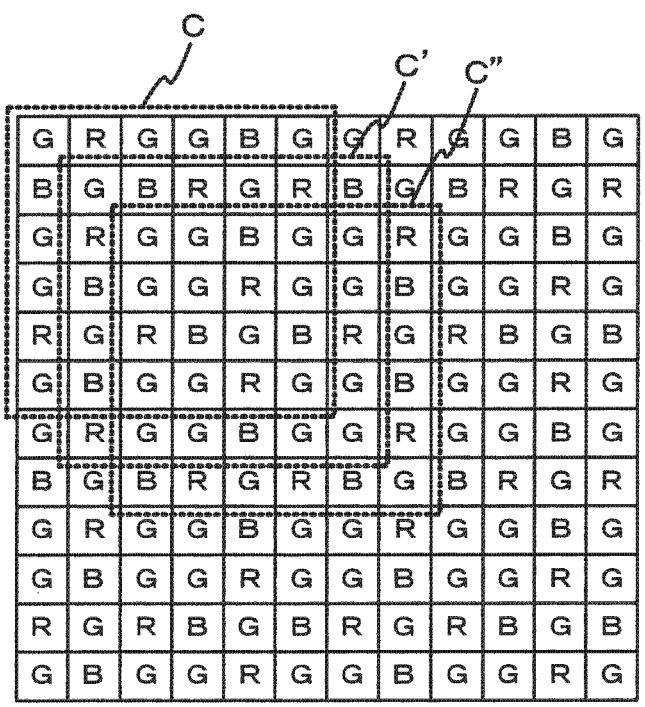
FIG. 6 is a diagram for explaining the principles of a basic array pattern included in the color filter illustrated in FIG. 4.

In the basic array pattern C illustrated as an example in FIG. 6, the color filter arrays of the first and third lines out of the first to sixth row direction lines are GRGGBG. The color filter array of the second line is BGBRGR. The color filter arrays of the fourth and sixth lines are GBGGRG. The color filter array of the fifth line is RGRBGB. In the example illustrated in FIG. 6, basic array patterns C, C', C" are illustrated. The basic array pattern C' is the basic array pattern C shifted respectively by 1 pixel each in the row direction and column direction. The basic array pattern C" is the basic array pattern C shifted respectively by 2 pixels each in the row direction and column direction. Thus in the color filter 21, the same color filter array results even if it is the basic array patterns C', C" that are repeatedly disposed along the row direction and column direction.

The imaging device 100 includes a phase difference AF function. The image pick-up device 20 includes plural pixels for phase difference detection, employed when the phase difference AF function operates. The plural pixels for phase difference detection are placed in a predetermined pattern.

Figure 7:
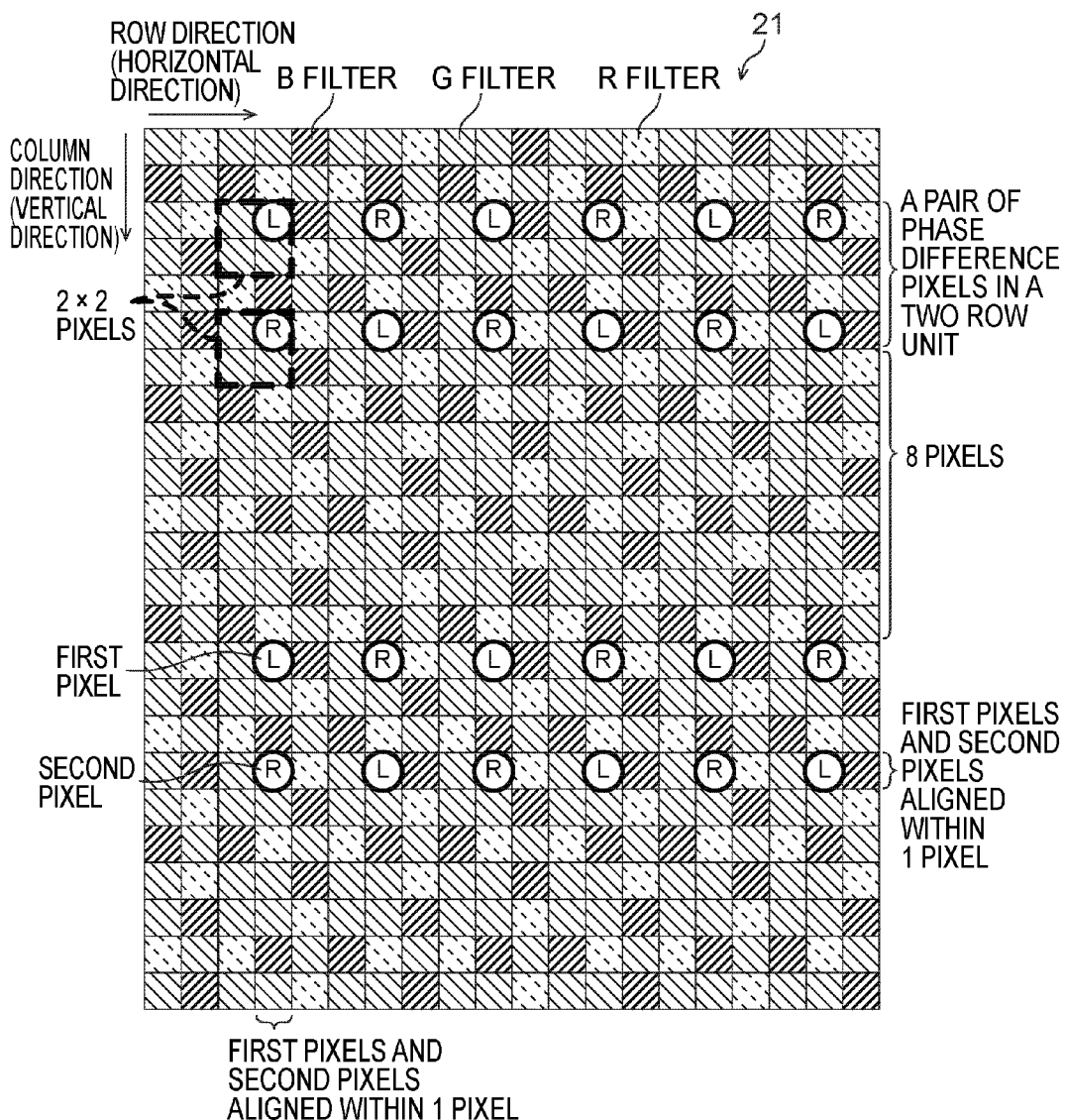
FIG. 7 is a schematic configuration diagram illustrating an example of placement of phase difference pixels in an image pick-up device included in an imaging device according to the first exemplary embodiment.

FIG. 7 is a schematic diagram of an example of correspondence relationships between a portion of the color filter 21, and pixels employed for phase difference detection of the portion. As illustrated in the example of FIG. 7, the pixels employed for phase difference detection are first pixels L having light to the left half portion in the row direction of the pixel blocked, or second pixels R having light to the right half portion in the row direction of the pixel blocked. In the following explanation, when there is no need to discriminate between the first pixels L and the second pixels R, they are called phase difference pixels.

Figure 8:
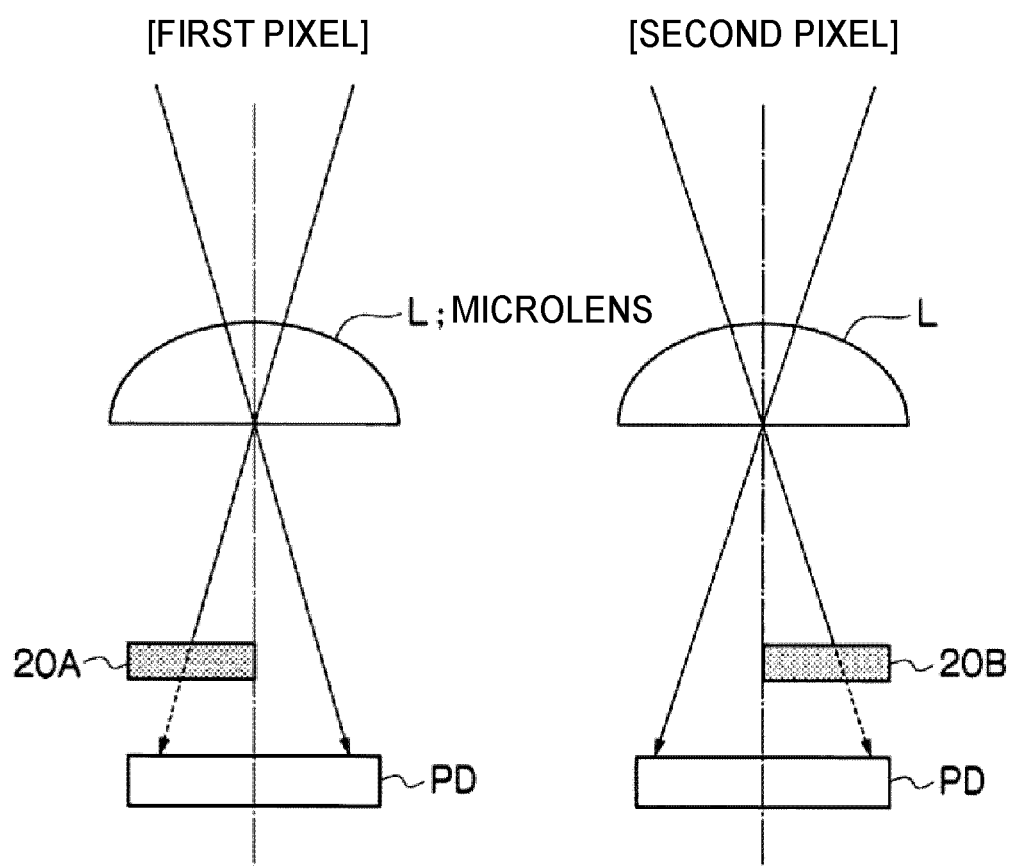
FIG. 8 is a schematic configuration diagram illustrating an example of a configuration of phase difference pixels (a first pixel and a second pixel) included in an image pick-up device of an imaging device according to the first exemplary embodiment.

An example of a first pixels L and second pixels R placed on the image pick-up device 20 is illustrated in FIG. 8. As illustrated in the example of FIG. 8, the first pixels L each include a light-blocking member 20A, and the second pixels R each include a light-blocking member 20B. The light-blocking members 20A are provided at the front face side of a photodiode PD (microlens L side), and block light to the left half portion of the light receiving face. The light-blocking members 20B are provided at the front face side of a photodiode PD, and block light to the right half portion of the light receiving face.

The microlens L and the light-blocking members 20A, 20B function as a pupil divider, and the first pixels L receive light only from light rays passing through an exit pupil of imaging lenses 16 on the left side of the optical axis, the second pixels R receive light only from light rays passing through the exit pupil of the imaging lenses 16 on the right side of the optical axis. Thus the light rays passing through the exit pupil are divided to the left and right by the microlens L and the light-blocking members 20A, 20B serving as a pupil divider, and are respectively incident to the first pixels L and the second pixels R.

Portions in-focus (in a focused state), out of the subject-image corresponding to the light rays of the left half portion and the subject-image corresponding to the light rays on the right half portion among the light rays passing through the exit pupil of the imaging lenses 16, are focused at the same position on the image pick-up device 20. Conversely, portions in focus in front or in focus behind are incident to different respective positions on the image pick-up device 20 to each other (with displaced phase). This thereby enables a parallax image (left eye image, and right eye image) to be acquired with different parallax for the subject-image corresponding to the light rays of the left half portion, and the subject-image corresponding to the light rays of the right half portion.

The imaging device 100 detects a phase displacement amount based on pixel values of the first pixels L and pixel values of the second pixels R by operating the phase difference AF function. The in-focus position of the imaging lens is then adjusted according to the detected phase displacement amount. Note that in the following, reference numerals are not appended when explanation does not need to discriminate between the light-blocking members 20A, 20B and they are referred to collectively as "light-blocking members".

The image pick-up device 20 is classified into a first pixel group, a second pixel group, and a third pixel group. The first pixel group indicates, for example, the plural first pixels L. The second pixel group indicates, for example, the plural second pixels R. The third pixel group indicates, for example, the plural normal pixels (an example of third pixels). Reference here to "normal pixels" means, for example, pixels other than the phase difference pixels (for example pixels without light-blocking members). In the following a RAW image output from the first pixel group is referred to as a "first image", a RAW image output from the second pixel group is referred to as a "second image", and a RAW image output from the third pixel group is referred to as a "third image".

Each of the pixels included in the first and second pixel groups are placed such that the first pixel group and the second pixel group are positioned aligned within 1 pixel of each other in the row direction. Moreover, each of the pixels included in the first pixel group and the second pixel group are placed such that the first pixel group and the second pixel group are positioned aligned within 1 pixel of each other in the column direction. In the example illustrated in FIG. 7, the first pixels L and the second pixels R are placed alternately to each other in a straight line shape along the row direction and the column direction, with a spacing of plural pixels worth between each other.

In the example illustrated in FIG. 7, the positions of each of the pixels included in the first pixel group and the second pixel group are positioned aligned within 1 pixel of each other in both the row direction and the column direction; however the positions may be positioned so as to fall within a specific number of pixels (for example within 2 pixels) of each other in at least one of the row direction or the column direction. In order to suppress to the maximum extent the occurrence of image misalignment caused by factors other than misaligned focus, as illustrated in the example in FIG. 7, preferably the positions of each of the pixels included in the first and second pixel groups are positioned aligned with each other so as to fall within 1 pixel in both the row direction and the column direction.

The phase difference pixels are, as illustrated in the example in FIG. 7, provided to pixels of the square array of G filters corresponding to 2×2 pixels. Namely, in the example of FIG. 7, phase difference pixels are allocated to the pixels at the top right corner of the 2×2 pixels of G filters as viewed face-on in the diagrams. Normal pixels are also placed between the phase difference pixels, with normal pixels allocated to the remaining pixels in the 2×2 pixels of G filters. Moreover, in the example illustrated in FIG. 7, the rows of phase difference pixels of first pixels L and second pixels R alternately placed along the row direction are configured in pairs of 2-row units, placed such that there is a separation of a specific number of pixels between the pairs (8 pixels in the example in FIG. 7) in the column direction.

In this manner, in the color filter 21, the light-blocking members are provided to the pixels at the top right corner of the 2×2 pixels of G filters, with the phase difference pixels regularly placed along the column direction and the row direction with plural pixels worth of separation therebetween. Thus, since there are comparatively many normal pixels placed at the periphery of the phase difference pixels, the interpolation precision can be raised in cases in which pixel values of the phase difference pixels are interpolated from the pixel values of the normal pixels. Moreover, each of the pixels included in the first to the third pixel groups is placed so that each of the normal pixels employed for interpolation of phase difference pixels are not employed more than once, enabling a further improvement in interpolation precision to be expected.

Returning to FIG. 3, the image pick-up device 20 outputs the first image (digital signal representing the pixel values of each of the first pixels L) from the first pixel group, and outputs the second image (digital signal representing the pixel values of each of the second pixels R) from the second pixel group. The image pick-up device 20 outputs the third image (digital signal representing the pixel values of each of the normal pixels) from the third pixel group. The third image output from the third pixel group is a chromatic image, and is, for example, a color image with the same color array as the array of the normal pixels. The first image, the second image, and the third image output from the image pick-up device 20 are temporarily stored in the volatile storage region in the memory 26 through the interface section 24.

Figure 9:
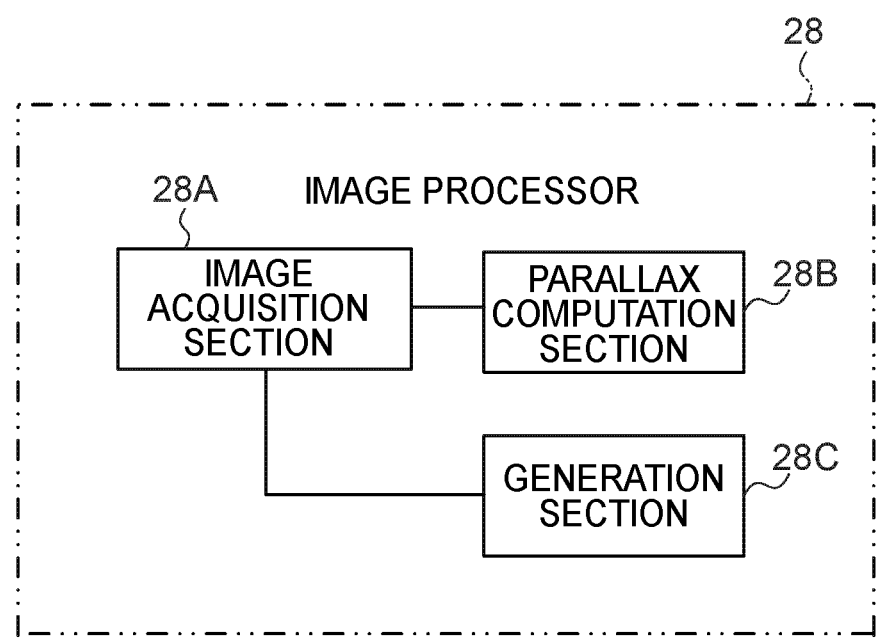
FIG. 9 is a functional block diagram illustrating an example of relevant functions of an image processor included in an imaging device according to the first exemplary embodiment.

FIG. 9 illustrates an example of relevant functions related to the present invention from the plural functions contained in the image processor 28. As illustrated in FIG. 9, the image processor 28 includes an image acquisition section 28A, a parallax computation section 28B, and a generation section 28C, implemented by plural functional circuits related to image processing configured as a single integrated circuit that is an Application Specific Integrated Circuit (ASIC). However, the hardware configuration is not limited thereto, and another hardware configuration may be employed, for example a programmable logic device, or a computer including a CPU, ROM, and RAM.

The image acquisition section 28A acquires the first image and the second image output from the image pick-up device 20. The parallax computation section 28B computes the parallax indicated by the amount of displacement between each of the pixels of the first image and the corresponding pixels in the second image acquired by the image acquisition section 28A. The generation section 28C generates a first display image based on the third image output from the image pick-up device 20, and also generates a second display image employed in focus verification based on the first and second images acquired by the image acquisition section 28A.

Figure 10:
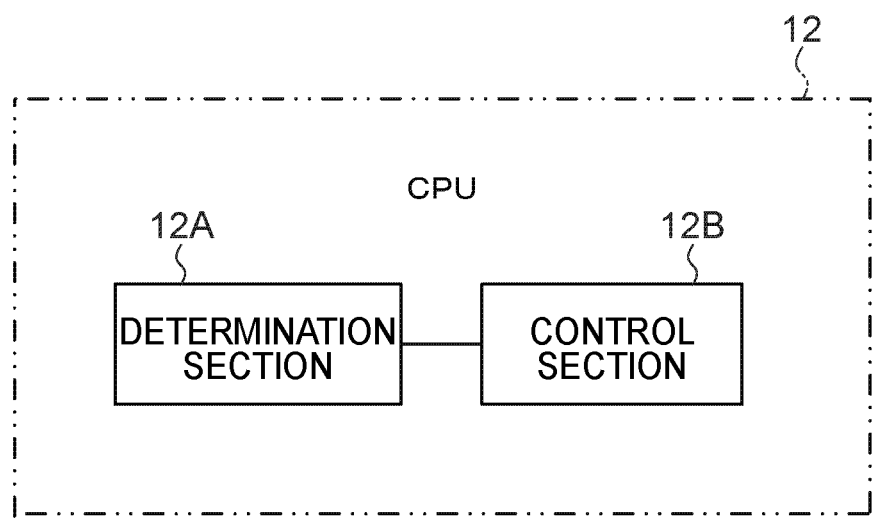
FIG. 10 is a functional block diagram illustrating an example of relevant functions of a CPU included in an imaging device according to the first exemplary embodiment.

FIG. 10 is illustrates an example of a relevant functions related to present invention from plural functions included in the CPU 12. As illustrated in FIG. 10, the CPU 12 includes a determination section 12A and a control section 12B. In the first exemplary embodiment, the determination section 12A and the control section 12B that operate as the determination section and the control section according to the present invention are implemented by executing a lens movement control processing program, described below; however, the present invention is not limited thereto. For example, the determination section 12A and the control section 12B may be implemented by an ASIC or a programmable logic device.

The determination section 12A determines an operation movement ratio based on a factor that defines a depth representing a permissible range for acceptable state of focus (referred to below simply as "factor"), and based on parallax computed by the parallax computation section 28B. Reference here to "operation movement ratio" indicates a coefficient for converting an operation amount (a rotation amount for example) by which the focusing lens 302 is instructed to move to a movement amount of the focusing lens 302, and is a coefficient to make the movement amount of the focusing lens 302 after conversion smaller according to the decrease in parallax. Reference here to the "movement amount of the focusing lens 302" indicates, for example, a movement amount along the optical axis L1 direction of the focusing lens 302. In the first exemplary embodiment, the "decrease in parallax" indicates, in other words, that the value of parallax irrespective of the sign (plus or minus) of the parallax (for example, the absolute value of the parallax) gets smaller. In the first exemplary embodiment, the subject depth of field is applied as the above "depth", however there is no limitation thereto, and the focal point depth may be employed. In the first exemplary embodiment, data indicating the position of the focusing lens 302 on the optical axis L1 is applied as an example of the above "factor" (for example, position data capable of identifying the current position within the slidable range of the slide mechanism 303 (for example, one dimensional or two dimensional coordinates)).

The control section 12B performs control on the motor 304 so as to move the focusing lens 302 by an amount equivalent to the movement amount determined based on the operation movement ratio determined by the determination section 12A, and the operation amount by which the focusing lens 302 is instructed to move (referred to below simply as "operation amount"). Reference here to an "amount equivalent to the movement amount determined based on the operation movement ratio and the operation amount" is, for example, the product of the operation movement ratio and the operation amount, however the present invention is not limited thereto. For example, a value obtained by substituting the product of the operation movement ratio and the operation amount into a specific computation formula may be employed. Reference here to a "specific computation formula" indicates, for example, a computation formula that decreases the manufacturing error of the slide mechanism 303, the motor 304, etc., a computation formula that simply adds, subtracts, multiplies, or divides the product of the operation movement ratio and the operation amount by a specific value (for example an error correction coefficient), or the like.

In the motor 304 according to the first exemplary embodiment, the drive amount is determined according to the number of drive pulses, and so the control section 12B determines the number of drive pulses representing an amount equivalent to the movement amount determined based on the operation movement ratio and the operation amount, and drives the motor 304 according to the determined number of drive pulses. The focusing lens 302 is thereby moved in the optical axis L1 direction by a movement amount according to the drive amount of the motor 304.

Figure 11:
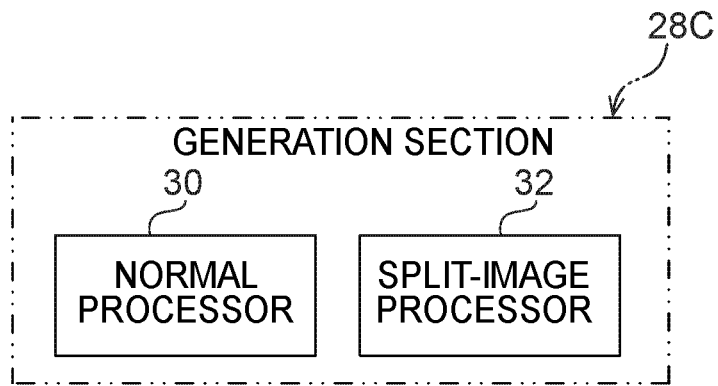
FIG. 11 is a functional block diagram illustrating an example of relevant functions of a generating section included in an imaging device according to the first exemplary embodiment.

FIG. 11 illustrates an example of functions contained in the generation section 28C. As illustrated in FIG. 11, the generation section 28C includes a normal processing section 30, and a split-image processing section 32. The normal processing section 30 generates a chromatic normal image, serving as an example of a first display image, by processing the R, G, B signals corresponding to the third pixel group. The split-image processing section 32 generates an achromatic split-image that is an example of a second display image by processing the G signals corresponding to the first pixel group and the second pixel group.

Returning to FIG. 3, the encoder 34 converts the input signal into a signal of another format and outputs the converted signal. The HYBRID FINDER 220 includes an LCD 247 that displays an electronic image. The number of pixels in a specific direction in the LCD 247 (for example the number of pixels in the row direction that is the parallax generation direction), is less than the number of pixels in the same direction of the display section 213. The display control section 36A is connected to the display section 213, the display control section 36B is connected to the LCD 247, and images are displayed on the LCD 247 or the display section 213 by selectively controlling the LCD 247 and the display section 213. In the following, when there is no need to discriminate between the display section 213 and the LCD 247, they are referred to collectively as "display devices".

The imaging device 100 according to the first exemplary embodiment is configured to be switchable between a manual focus mode and an autofocus mode using the dial 212 (the focus mode switching section). When one of the focus modes has been selected, the display control section 36 displays on the display devices a live-view image onto which the split-images have been synthesized. Moreover, when the autofocus mode has been selected using the dial 212, the CPU 12 operates as a phase difference detection section and an automatic focal point adjusting section. The phase difference detection section detects the phase difference between the first image output from the first pixel group and the second image output from the second pixel group. Based on the detected phase displacement, the automatic focal point adjusting section controls the motor 304, from the device controller 22 through the mounts 256, 346, to move the focusing lens 302 to the in-focus position such that the defocus amount of the focusing lens 302 becomes zero. The "defocus amount" referred to above indicates, for example, a phase displacement amount between the first image and the second image.

The eyepiece detection section 37 detects a person (for example a photographer) looking into the finder eyepiece 242, and outputs the detection result to the CPU 12. The CPU 12 is accordingly able to ascertain whether or not the finder eyepiece 242 is being used, based on the detection result of the eyepiece detection section 37.

The external I/F 39 is connected to a communication network, such as a Local Area Network (LAN) or the internet, and transmission and reception of various data between external devices (for example a printer) and the CPU 12 is achieved through the communication network. When connected to a printer as an external device, the imaging device 100 is accordingly capable of outputting captured still images to a printer and printing. When connected to a display as an external device, the imaging device 100 is capable of outputting captured still images and live-view images to the display, and displaying thereon.

Figure 12:
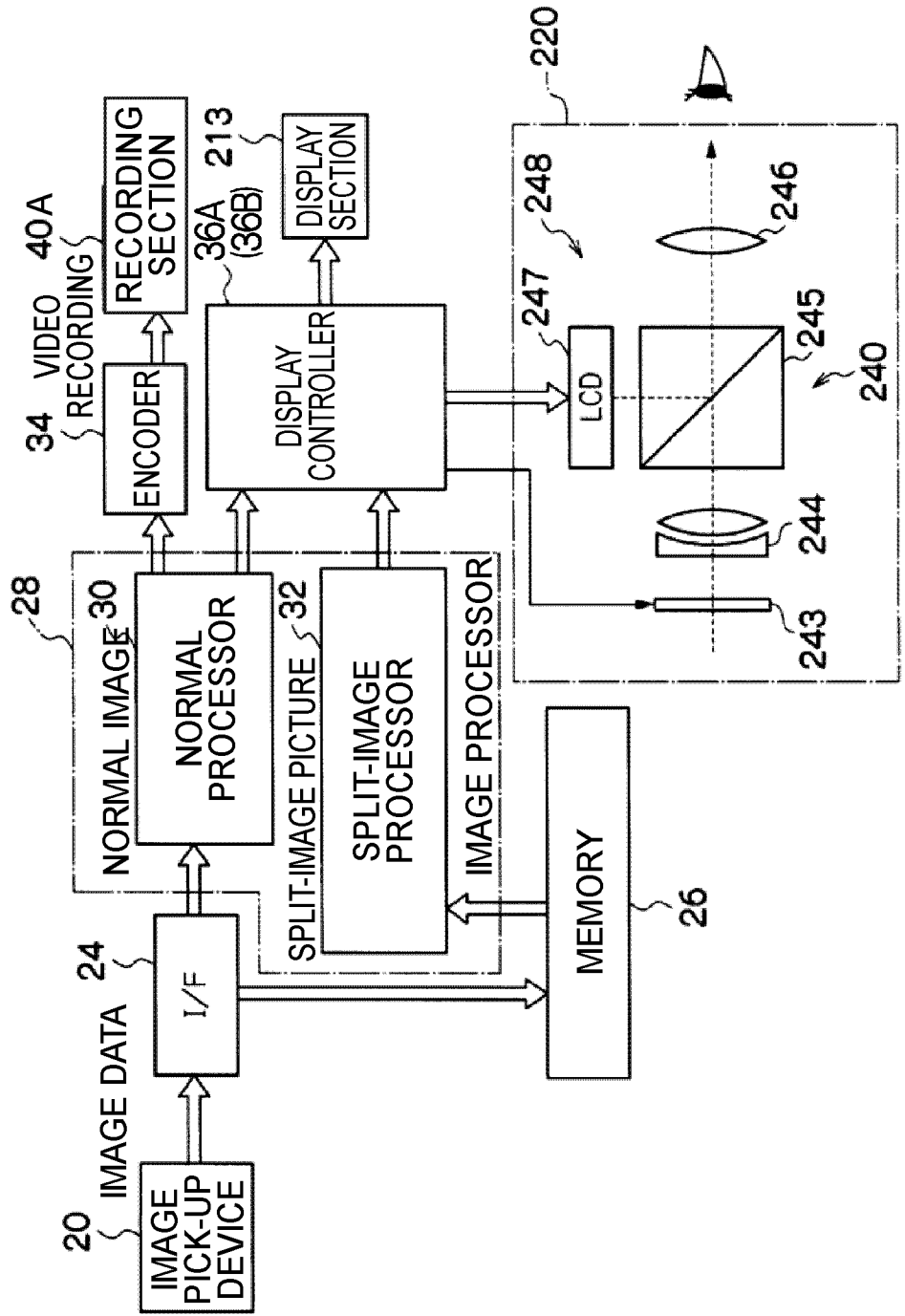
FIG. 12 is a functional block diagram illustrating an example of relevant functions of an imaging device according to the first exemplary embodiment.

FIG. 12 is a functional block diagram illustrating an example of relevant functions of the imaging device 100 according to the first exemplary embodiment. Common portions to the block diagram illustrated in FIG. 3 are appended with the same reference numerals.

The normal processor 30 and the split-image processor 32 each include a WB gain section, a gamma correction section, and a synchronization processor (not illustrated in the drawings), and perform serial signal processing in each of the processors on the digital signals (RAW images) originally temporarily stored in the memory 26. Namely, the WB gain section executes white balance (WB) by adjusting the gain of the R, G, B signals. The gamma correction section gamma corrects each of the R, G B signals for which WB has been executed by the WB gain section. The synchronization processor performs color interpolation processing corresponding to the color filter array of the image pick-up device 20, and generates synchronized R, G, B signals. The normal processor 30 and the split-image processor 32 perform parallel image processing on the RAW images each time one screen's worth of RAW image is acquired by the image pick-up device 20.

Figure 13:
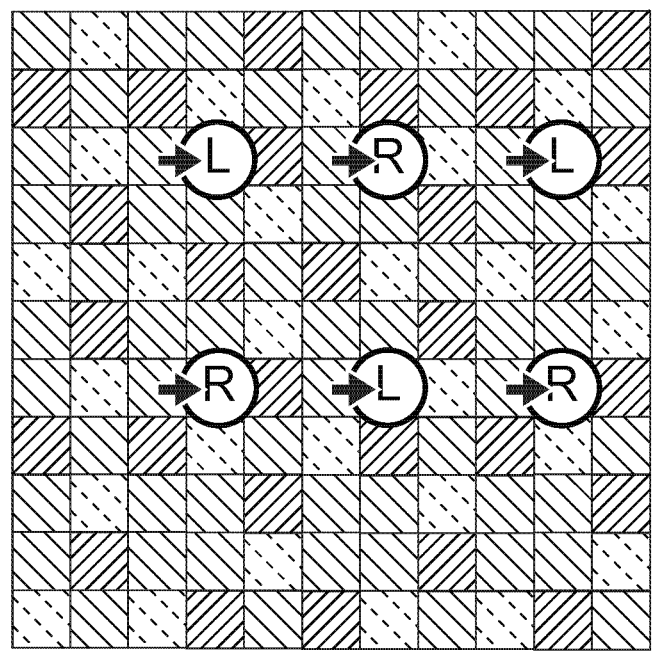
FIG. 13 is a schematic diagram illustrating an example of a way in which phase difference pixels in an image pick-up device included in an imaging device according to the first exemplary embodiment are interpolated using normal pixels.

The normal processor 30 is input with the R, G, B RAW images from the interface section 24, and, as illustrated in the example in FIG. 13, generates R, G, B pixels for the third pixel group by interpolation using peripheral pixels of the same color as the first pixel group and the second pixel group (for example the adjacent G pixels). This thereby enables a normal image for recording to be generated based on the third image output from the third pixel group.

The normal processor 30 outputs image data of the generated normal image for recording to the encoder 34. The R, G, B signals processed by the normal processor 30 are converted (encoded) by the encoder 34 into a recording signal and recorded in a recording section 40A. Moreover, a normal image for display that is an image based on the third image processed by the normal processor 30 is output to the display control section 36. In the following, for convenience of explanation, when there is no need to discriminate between the "normal image for recording" and the "normal image for display" the words "for recording" and the words "for display" are omitted, and they are referred to collectively as "normal images".

The image pick-up device 20 is capable of changing the respective exposure conditions of the first pixel group and the second pixel group (for example, the shutter speed with the electronic shutter), and thereby capable of acquiring images under different exposure conditions at the same time. The image processor 28 is consequently capable of generating images over a wide dynamic range based on the images under different exposure conditions. Due to also being able to acquire plural images under the same exposure conditions at the same time, adding these images together enables a high sensitivity image with little noise to be generated, or a high resolution image to be generated.

The split-image processor 32 extracts the G signals of the first pixel group and the second pixel group from the RAW images temporarily stored in the memory 26, and generates an achromatic split-image based on the G signals of the first pixel group and the second pixel group. Both the first pixel group and the second pixel group extracted from the RAW images are pixel groups from the G filter pixels as described above. The split-image processor 32 is accordingly able to generate an achromatic left parallax image and an achromatic right parallax image based on the G signals of the first pixel group and the second pixel group. In the following, for convenience of explanation, the above "achromatic left parallax image" is referred to as the "left eye image", and the above "achromatic right parallax image" is referred to above the "right eye image".

The split-image processor 32 synthesizes the left eye image based on the first image output from the first pixel group together with the right eye image based on the second image output from the second pixel group and generates a split-image. Image data of the generated split-image is output to the display control section 36.

The display control section 36 generates image data for recording corresponding to the third pixel group input from the normal processor 30, and image data for display based on the image data of the split-image corresponding to the first and second pixel groups input from the split-image processor 32. For example, the display control section 36 synthesizes a split-image represented by image data input from the split-image processor 32 in a display region of a normal image represented by image data for recording corresponding to the third pixel group input from the normal processor 30. The image data obtained by synthesizing is then output to display devices. Namely, the display control section 36A outputs the image data to the display section 213, and the display control section 36B outputs the image data to the LCD 247.

Figure 14B:
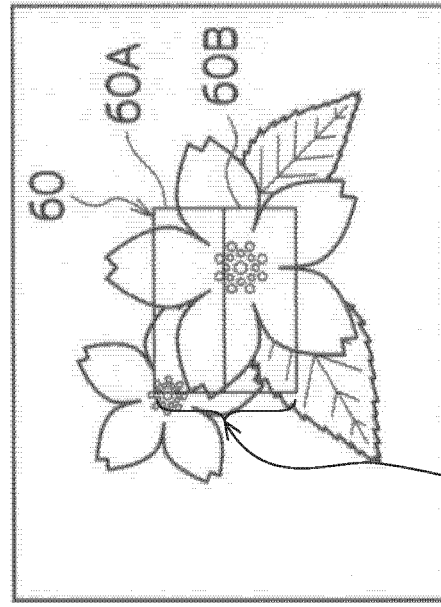
FIG. 14B is a screen view illustrating an example of a live-view image displayed on a display section of an imaging device according to the first exemplary embodiment, for a live-view image in a focused state.
Figure 14A:
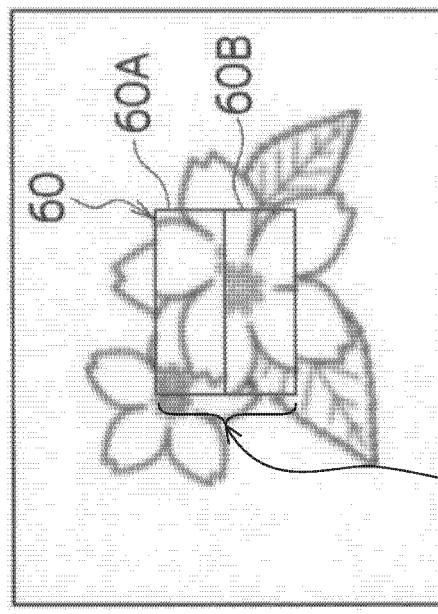
FIG. 14A is a screen view illustrating an example of a live-view image displayed on a display section of an imaging device according to the first exemplary embodiment, for a live-view image in an unfocused state.

The split-image generated by the split-image processor 32 is a multi-section image synthesized from one section of a left eye image, and one section of a right eye image. Examples of what is referred to here as a "multi-section image" are the split-images illustrated in FIG. 14A and FIG. 14B. The split-images illustrated in FIG. 14 are split-images of images synthesized from the top half image from the left eye image, and from the bottom half image from the right eye image, and are images in which the 2 sections of the images divided in 2 in the up-down direction are displaced with respect to each other in a specific direction (for example the parallax generation direction) according to the state of focus. The mode of the split-image is not limited to those of the examples in FIG. 14A, and FIG. 14B, and may be an image synthesized from one section of the left eye image and one section of the right eye image at a position corresponding to the position of a specific region of the display section 213. In such cases, for example, 4 sections of image divided in 4 in the up-down direction may be displaced with respect to each other in a specific direction (for example the parallax generation direction) according to the state of focus.

The method for synthesizing the split-image onto the normal image is also not limited to the synthesis method in which the split-image is fitted in place of an image of a portion of a normal image. For example, a synthesis method may be employed in which the split-image is superimposed on the normal image. Moreover, when superimposing the split-image, a synthesis method may be employed in which transparencies, of the image of a portion of a normal image onto which the split-image is to be superimposed and of the split-image, are appropriately adjusted for superimposition. In this manner the live-view image illustrating the subject-image that is successively captured is displayed on the screen of the display device, and the displayed live-view image is an image in which the split-image is displayed within a display region of the normal image.

The HYBRID FINDER 220 includes an OVF 240 and an EVF 248. The OVF 240 is a reverse Galileo finder including an object lens 244 and an eyepiece lens 246, and the EVF 248 includes the LCD 247, a prism 245, and the eyepiece lens 246.

A liquid crystal shutter 243 is overlaid at the front of the object lens 244, and the liquid crystal shutter 243 blocks light such that the optical image is not incident to the object lens 244 while the EVF 248 is being used.

The prism 245 reflects the electronic image or various data displayed on the LCD 247 and guides these toward the eyepiece lens 246, and synthesizes an optical image together with information (electronic image, various types of data) displayed on the LCD 247.

When the finder switching lever 214 is turned in the arrow SW direction illustrated in FIG. 1, switching is made at each turn between the OVF mode that enables a visual check to be made on an optical image using the OVF 240, and the EVF mode that enables a visual check to be made on the electronic image using the EVF 248.

In the OVF mode, the display control section 36B controls so that the liquid crystal shutter 243 is in a non-light blocking state, enabling a visual check to be made on an optical image through the eyepiece section. Moreover, only the split-image is displayed on the LCD 247. This thereby enables a finder image to be displayed in which the split-image is superimposed on a portion of the optical image.

In the EVF mode, the display control section 36B controls so that the liquid crystal shutter 243 is in a light blocking state, enabling a visual check to be made through the eyepiece section of an electronic image displayed alone on the LCD 247. Similar image data to the image data synthesized with the split-image for output on the display section 213 is input to the LCD 247. This enables the electronic image synthesized with the split-image to be displayed on a portion of the normal image, similarly to with the display section 213.

Figure 15:
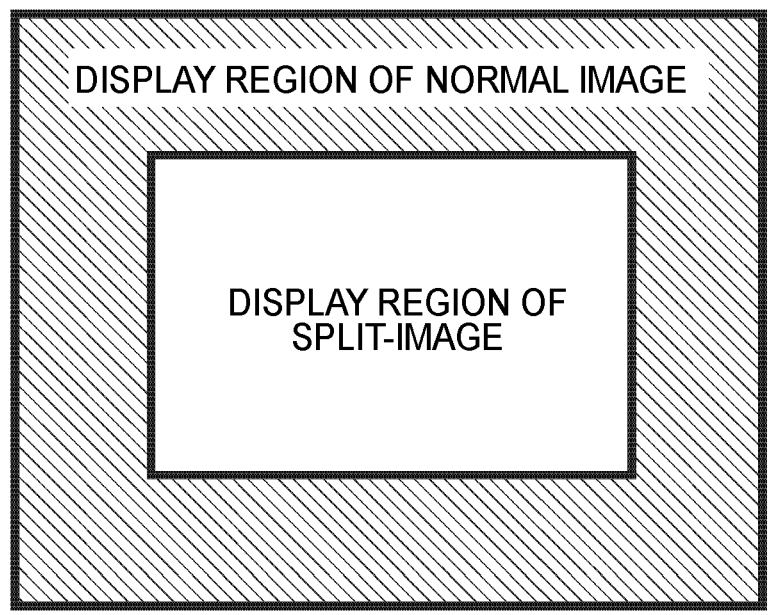
FIG. 15 is a schematic diagram illustrating an example of positions of a split-image display region and a normal image display region in a display device included in an imaging device according to the first exemplary embodiment.

FIG. 15 illustrates an example of a display region for each of the normal image and the split-image on a display device. As illustrated in the example in FIG. 15, the split-image is displayed within a rectangular frame at a central portion of the screen of the display device, and the normal image is displayed in a peripheral region outside the split-image. The edge line representing the rectangular frame illustrated in FIG. 15 is not actually displayed, however it is illustrated in FIG. 15 for ease of explanation.

Figure 16:
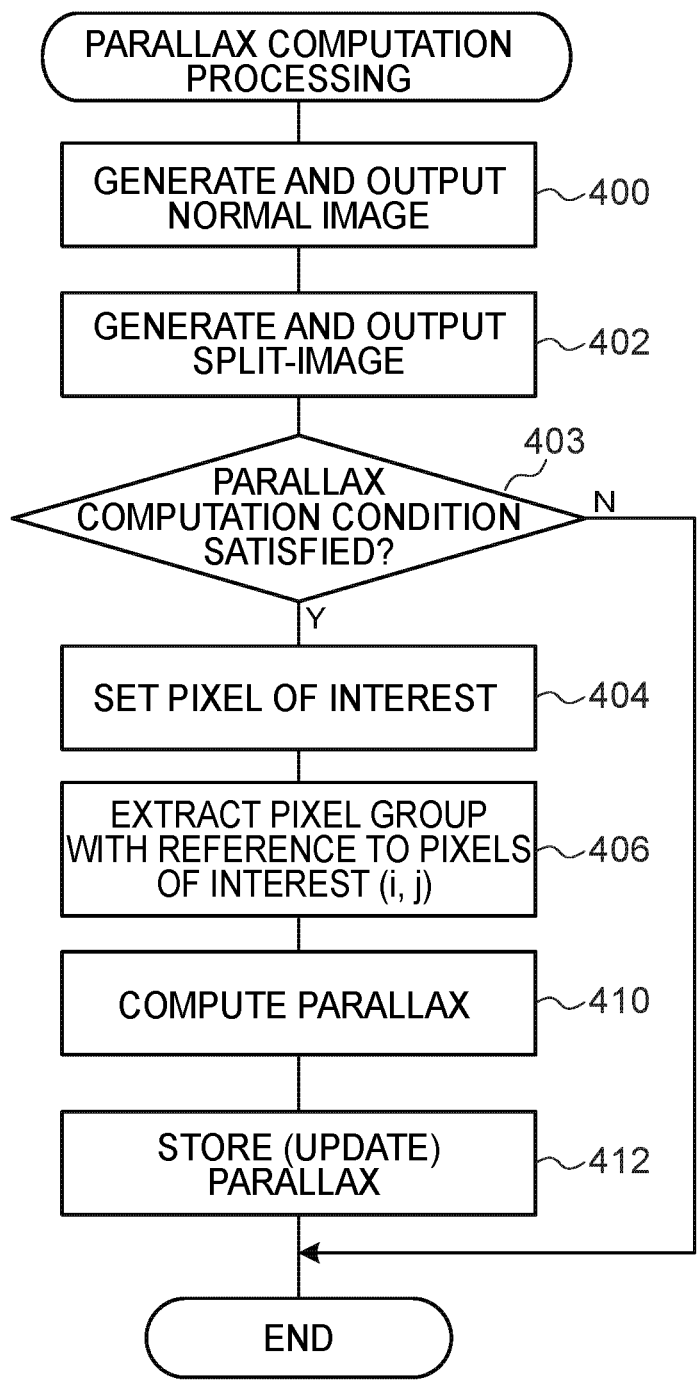
FIG. 16 is a flow chart illustrating an example of a flow of parallax computation processing according to a first exemplary embodiment.

As operation of the first exemplary embodiment, explanation next follows regarding parallax computation processing performed by the image processor 28 each time the first to third images are input, with reference to FIG. 16. Note that although an example is given here of a case in which the parallax computation processing is performed by the image processor 28, the present invention is not limited thereto. For example, configuration may be made such that the parallax computation processing is performed in the imaging device 100 by the CPU 12 executing a parallax computation processing program.

At step 400 in FIG. 16, a normal image is generated by the generation section 28C based on the input third image, and output to a specific storage region (for example the memory 26) and to the display control section 36.

At the next step 402, first the first and second images are acquired by the image acquisition section 28A. Then a left eye image and a right eye image are generated by the generation section 28C based on the first and second images, a split-image generated based on the generated left eye image and right eye image, and the split-image based on the generated left eye image and right eye image is output to the display control section 36. When the display control section 36 has been input with the normal image output at step 400, and the split-image output at step 402, the display control section 36 controls to display the normal image on a display device, and to display the split-image within the display region of the normal image.

Thus when the steps 400, 402 have been performed in this manner by the generation section 28C, live view images are displayed on the display section 213 and the HYBRID FINDER 220 as illustrated in the examples in FIG. 14A and FIG. 14B. In the examples in FIG. 14A and FIG. 14B, the split-image is displayed in the region inside a frame 60, corresponding to the split-image display region illustrated as an example in FIG. 15, and the normal image is displayed in the region outside the frame 60, corresponding to the normal image display region.

Namely, the first and second pixel groups are provided so as to correspond to the size of the frame 60. The split-image is broadly divided into an image (parallax image) of an upper half 60A of the frame 60 of a left eye image corresponding to the first image output from the first pixel group, and an image (parallax image) of a lower half 60B of the frame 60 of a right eye image corresponding to the second image output from the second pixel group.

In cases in which the subject-image corresponding to the image in the frame 60 is not in focus in the imaging lenses 16, the image is displaced in the parallax generation direction (for example the row direction) at a boundary in the split-image between the parallax image of the upper half 60A and the parallax image of the lower half 60B, as illustrated in FIG. 14A. The image is also displaced in the parallax generation direction at the boundary between the normal image and the split-image. This shows that phase difference is occurring, and through using the split-image a photographer is able to visually discern that phase difference has occurred, and is able to visually discern the parallax generation direction.

However, in cases in which the subject-image corresponding to the image in the frame 60 is in focus in the imaging lenses 16, the image is aligned at the boundary between the parallax image of the upper half 60A and the parallax image of the lower half 60B in the split-image, as illustrated in FIG. 14B. The image is also aligned at the boundary between the normal image and the split-image. This shows that phase difference has not occurred, and, through using the split-image a photographer is able to visually discern that phase difference has not occurred.

Thus the photographer is able to check the state of focus of the imaging lenses 16 using the split-image displayed on the display device. Moreover, in manual focus mode, the focus misalignment amount (defocus amount) can be made zero by manual operation of the focus ring 301.

At the next step 403, determination is made by the parallax computation section 28B as to whether or not a parallax computation condition has been satisfied. A condition that a parallax computation cycle has arrived is an example of a parallax computation condition. In the first exemplary embodiment, a time interval for each output of split-image at step 402 (for example the time interval for each frame) is employed as the parallax computation cycle, however there is no limitation thereto. For example, a time interval of every plural frames (for example, every 2 frames) may be employed as the parallax computation cycle, or a specific time interval (for example, 1 second) from when the imaging mode was set may be employed therefor. The parallax computation condition is not limited to a condition that a parallax computation cycle has arrived, and examples thereof include a condition that a user has input a specific instruction through the operation section 14, and a condition that a specific subject-image (for example, a person's face) has been detected. Negative determination is made at step 403 in cases in which the parallax computation condition has not been satisfied, and the parallax computation processing is ended. Affirmative determination is made at step 403 in cases in which the parallax computation condition has been satisfied, and processing proceeds to step 404.

Then at step 404, target pixels for parallax computation is set by the parallax computation section 28B from within the split-image generated at step 402 (pixels of interest (i, j)).

At the next step 406, a pixel group of specific block size, (Cx×Cy) pixels, is extracted by the image processor 28B as a pixel group with reference to the pixels of interest (i, j) set at step 404.

At the next step 410, parallax, representing a displacement amount of corresponding pixels in the right eye image extracted at step 406 for each of the pixels in the left eye image extracted at step 406, is computed by the parallax computation section 28B. At step 410, the parallax computation section 28B may compute the parallax using a split-image of a selected AF area by face recognition or discriminating the main subject-image (object recognition) etc. In such cases, at step 404, the parallax computation section 28B may set the pixels of interest (i, j) regarding the AF area selected by using object recognition.

At step 410, based on the pixel group of the left eye image extracted at step 406, the image processor 28, for example, first searches within the right eye image for a pixel group matching characteristic points. Namely, degree of matching is evaluated between the pixel group (block) extracted from the left eye image, and, from out of the right eye image, blocks in the right eye image corresponding to the pixel group (block) extracted from the left eye image. Then, the pixel acting as a reference in the right eye image block when there is the maximum degree of matching between blocks is set as the corresponding point pixel of the right eye image, to correspond to the pixel of interest in the left eye image. The degree of matching is evaluated between blocks in the block matching method of the first exemplary embodiment by, for example, employing the sum of squared difference (SSD) in brightness of the pixels in each of the blocks as a degree of matching evaluation function (an SSD block matching method).

In an SSD block matching method, the computation is performed according to the following equation on each of the pixels f (i, j), g (i, j) in the blocks of both comparison target images.

$$SSD = \sum_i \sum_j \{f(i, j) - g(i, j)\}^2 \qquad \text{Formula (1)}$$

The computation of Formula (1) is performed while moving the position of the block in the right eye image within a specific search region, and the pixel at the position in the search region with the minimum SSD value is set as the search target pixel. Then, the parallax representing the displacement amount between the pixel of interest in the left eye image and the corresponding pixel found in the right eye image is computed.

At the next step 412, the parallax computed at step 410 is stored by the parallax computation section 28B in a specific storage region of the memory 26. The present parallax computation processing is then ended. When there is already a parallax stored in the specific storage region of the memory 26 at step 412, the parallax is updated by overwriting the specific region of the memory 26 with the latest parallax each time step 412 is performed.

Figure 17:
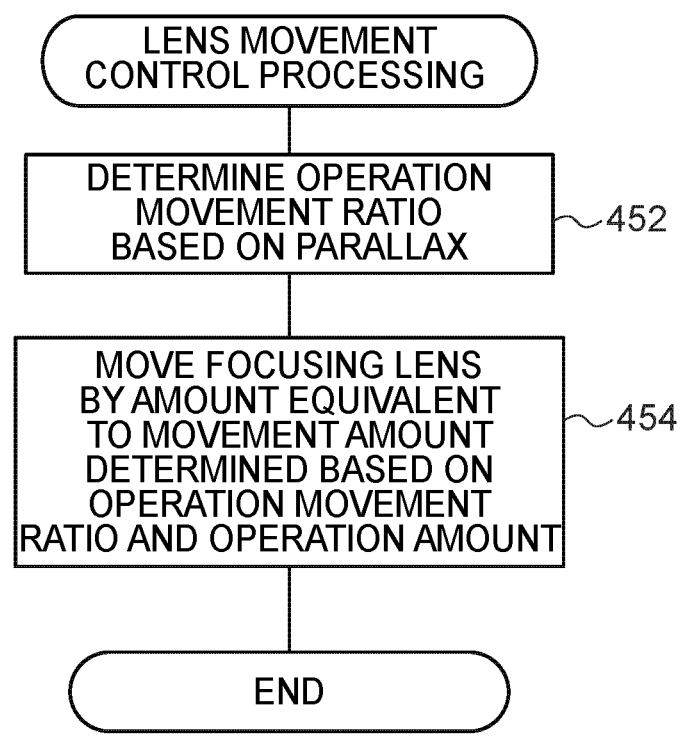
FIG. 17 is a flowchart illustrating an example of a flow of lens movement control processing according to a comparative example.

Explanation next follows regarding lens movement control processing of a comparative example that operates with an assumed basic configuration, before explaining relevant operation of the present invention. FIG. 17 illustrates an example of a flow of processing of a lens movement control processing program executed by the CPU 12 when an execution start condition has been satisfied. Reference here to an "execution start condition" indicates a condition that parallax has been newly stored in the specific storage region of the memory 26 by performing the processing of step 412.

First, at step 452, the operation movement ratio is determined by the CPU 12 based on the parallax stored in the specific storage region of the memory 26. In the first exemplary embodiment, the operation movement ratio is defined by a function including the function represented by Equation (1) (for example, the function G illustrated in FIG. 18); however the present invention is not limited thereto. For example, a lookup table (LUT) may be employed that takes an independent variable (parallax) of the function G illustrated in FIG. 18 as input, and outputs a dependent variable of the function G (operation movement ratio).

At the next step 454, the motor 304 is controlled by the CPU 12 so as to move the focusing lens 302 by an amount equivalent to the movement amount determined based on the operation movement ratio and the operation amount determined at step 452, then the current lens movement control processing is ended.

Figure 18:
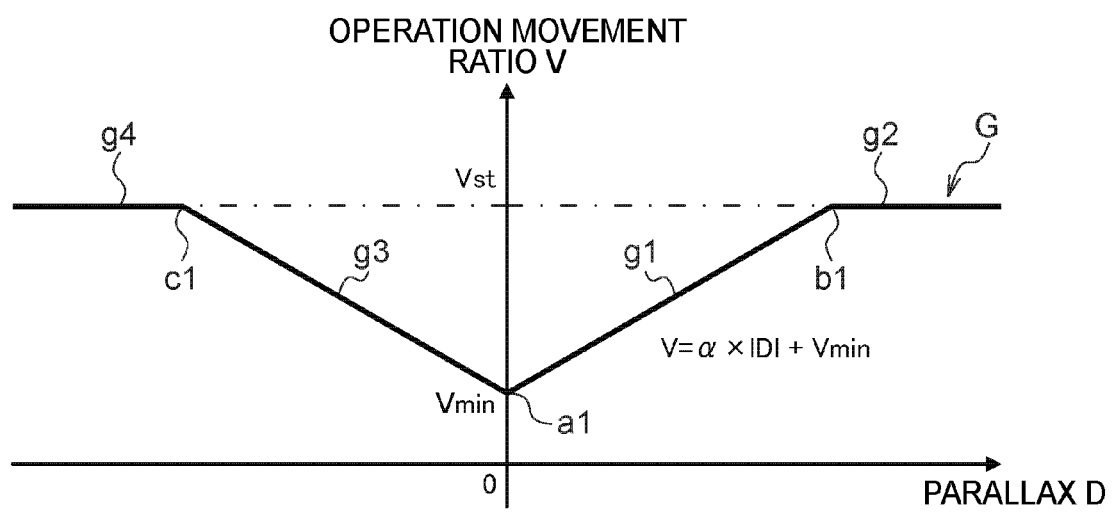
FIG. 18 is a graph illustrating an example of a function for use in lens movement control processing of a comparative example.

FIG. 18 illustrates an example of a function G to define the operation movement ratio determined by the CPU 12 performing step 452. As illustrated in FIG. 18, the function G includes functions g1 to g4 that are each linear functions. Equation (1) expresses the function g1 and the function g3. Equation (1) expresses a linear function with a slope α, an independent variable of parallax D (absolute parallax), a dependent variable of operation movement ratio V, and an intercept of Vmin, which is the minimum value of operation movement ratio V. A fixed value is employed here as the intercept Vmin to avoid confusion; however a variable value that changes according to various conditions may be employed therefor.

$$V=\alpha \times |D|+V\text{min} \quad \text{Equation (1)}$$

The slope α is a coefficient uniquely determined by the parallax stored in the specific storage region of the memory 26, and represents a coefficient for converting the parallax D into units of the operation movement ratio V. The gradient of the functions g1, g3 expressed by slope α is shallower as the absolute value of the parallax stored in the specific storage region of the memory 26 increases. Namely, the absolute value of the slope α has the characteristic of becoming smaller as the absolute value of the parallax stored in the specific storage region of the memory 26 increases.

Moreover, the slope of function g1 is a positive value, and the slope of function g3 is a negative value, and both have the characteristic that the operation movement ratio V is smaller the smaller the absolute value of the parallax D. The function g1 and the function g3 are continuous through the inflection point a1 positioned at (0, Vmin).

The slope α having the above characteristics is, for example, determined by the CPU 12 based on the parallax stored in the specific storage region of the memory 26, and the functions g1, g3 are determined by the determined slope α and a predetermined intercept Vmin.

The function g2 is a function continuous with the function g1 through inflection point b1, and function g4 is a function continuous with the function g3 through the inflection point c1. The maximum value of the operation movement ratio V is predetermined, and so the inflection points b1, c1 are uniquely determined by determining the slope α. The range of the parallax D of the functions g2, g4 (the range of the parallax D where the maximum value Vst applies) is also determined by determining the inflection points b1, c1. Namely, the range of parallax D over which the maximum value Vst applies for the functions g2, g4 is wider the shallower the slope α.

However, the slope α of the functions g1, g3 included in the function G illustrated in FIG. 18 is a value representing a shallower gradient the larger the parallax stored in the specific storage region of the memory 26. This is because the slope α is determined under the assumption that when the parallax is larger, there is a higher estimated likelihood of the position of the focusing lens 302 being far from the in-focus position. However, when the slope α is determined by merely relying on the parallax, sometimes the operation movement ratio V is small despite the focusing lens 302 being in a position where there is no need to make the operation movement ratio V small. Namely, there are cases in which the operation movement ratio V is made small even though the subject depth of field is a subject depth of field that does not necessitate making the operation movement ratio V small. If the operation movement ratio V is made small even though the subject depth of field is a subject depth of field that does not necessitate making the operation movement ratio V small, then, for example, unnecessary time is taken to match a parallax of 0 as a result of making the slope α a shallower gradient than necessary. Unnecessary time being taken to match to a parallax of 0 means that there is a need to move the focusing lens 302 faster.

Moreover, when the slope α is determined merely relying on the parallax, then sometimes the operation movement ratio V is large despite the focusing lens 302 being positioned in a position where the operation movement ratio V does not need to be made large. Namely, sometimes the operation movement ratio V is made large despite the subject depth of field being a subject depth of field that does not necessitate making the operation movement ratio V large. Making the operation movement ratio V large despite the subject depth of field being a subject depth of field that does not necessitate making the operation movement ratio V large means, for example, that there is insufficient time to match to a parallax of 0 as a result of the slope α being steeper than necessary. There being insufficient time to match to a parallax of 0 means that there is a need to move the focusing lens 302 more slowly.

In this manner, when the operation movement ratio V is defined by CPU 12 according to function G illustrated in FIG. 18, the inflection points b1, c1 are sometimes determined inappropriately for the current position of the focusing lens 302. Thus in the imaging device 100 according to the first exemplary embodiment, the lens movement control processing illustrated in FIG. 19 is executed.

Figure 19:
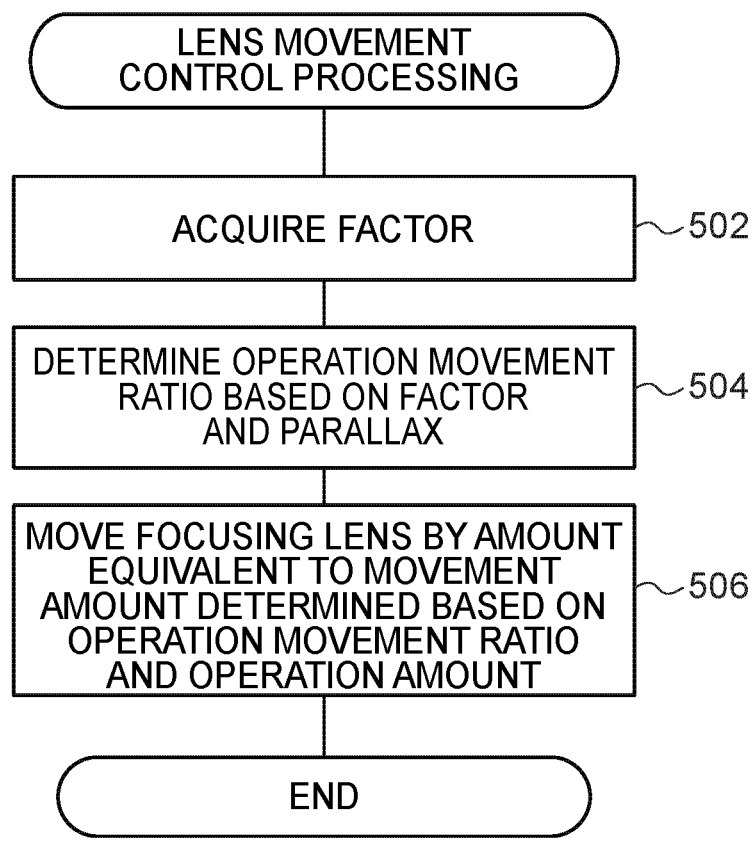
FIG. 19 is a flowchart illustrating an example of a flow of lens movement control processing according to the first exemplary embodiment.

Explanation follows for operation of the first exemplary embodiment, regarding the lens movement processing performed by the imaging device 100 by the CPU 12 executing the lens movement processing program according to the first exemplary embodiment when the above execution start condition has been satisfied, with reference to FIG. 19.

First, at step 502, the factor is acquired by the determination section 12A. Then at the next step 504, the operation movement ratio is determined by the determination section 12A based on the parallax stored in the specific storage region of the memory 26 and the factor acquired at step 502 (for example, based on the function P illustrated in FIG. 20). In the first exemplary embodiment the operation movement ratio is defined by a function including the function represented by Equation (2) below (for example, function P illustrated in FIG. 20); however the present invention is not limited thereto. For example, a LUT may be employed that takes the independent variable (parallax) of the function P illustrated in FIG. 20 as input, and the dependent variable of the function P (the operation movement ratio) as output.

At the next step 506, the motor 304 is controlled by the control section 12B so as to move the focusing lens 302 by an amount equivalent to the movement amount determined based on the operation movement ratio determined at step 504 and based on the operation amount. The current lens movement control processing is then ended.

Figure 20:
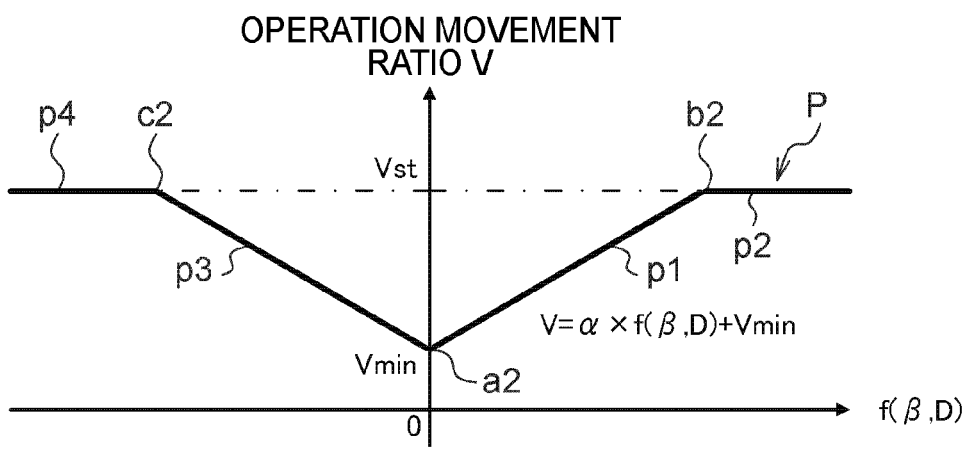
FIG. 20 is a diagram illustrating an example of a function for use in lens movement control processing according to the first exemplary embodiment.

FIG. 20 illustrates an example of a function P that defines the operation movement ratio determined by the determination section 12A by performing step 502. As illustrated in FIG. 20, the function P is defined by functions p1 to p4 that are each linear functions. Equation (2) expresses the function p1 and the function p3. Equation (2) is a linear function with a slope α, an independent variable f (β, D) determined by a function of factor β and parallax D, an operation movement ratio V as a dependent variable, and with Vmin as the intercept, which is the minimum value of operation movement ratio V. In order to avoid confusion, the example of the independent variable f (β, D) employed here a dependent variable of a function having the factor β and the parallax D as independent variables, and having the dependent variable that increases in value the larger the factor β and the parallax D. In order to avoid confusion, a fixed value is employed as the intercept Vmin, however a variable value may be employed that changes according to various conditions (for example, parallax D and factor β).

$$V = \alpha \times f(\beta, D) + V\text{min} \quad \text{Equation (2)}$$

The slope α is a coefficient uniquely determined by the parallax stored in the specific storage region of the memory 26 and the factor acquired at step 502, and represents a coefficient for converting the independent variable f (β, D) into units of the operation movement ratio V.

The gradient of the functions p1, p3 expressed by slope α becomes shallower as the value of the factor β increases. Namely, the absolute value of the slope α has the characteristic of becoming smaller as the factor β increases (the slope α is a shallower gradient the larger the factor β). Reference here to the "factor β increases" indicates, for example, that the current position of the focusing lens 302 on the optical axis L1 becomes further from a specific position (for example the in-focus position); however the present invention is not limited thereto. For example, "factor β increases" may indicate an increase in value of a factor that expresses a deeper subject depth of field by an increase in value. An example has been given in the first exemplary embodiment of a case in which the gradient of the functions p1, p3 expressed by the slope α has the characteristic of becoming shallower as the factor β increases; however the present invention is not limited thereto. For example, the gradient of the functions p1, p3 expressed by the slope α may have the characteristic of being shallower as the independent variable f (β, D) increases. Namely, the slope α may have the characteristic of the absolute value thereof becoming smaller as the independent variable f (β, D) (for example, the absolute value of the independent variable f (β, D)) including as the parallax D the parallax stored in the specific storage region of the memory 26 becomes larger.

The slope of the function p1 is a positive value, and the slope of the function p3 is a negative value, and both have the characteristic that the operation movement ratio V gets smaller as the independent variable f (β, D) gets smaller (for example, as the absolute value of the independent variable f (β, D) gets smaller). The function p1 and the function p3 are continuous through the inflection point a2 at position (0, Vmin).

The slope α having the above characteristic is, for example, determined by the determination section 12A based on the independent variable f (β, D), and the functions p1, p3 are determined according to the determined slope α and the predetermined intercept Vmin.

The functions p1, p3 are functions employed for absolute values of parallax D of a specific value or lower (for example, a specific range of the independent variable f (β, D) on the horizontal axis illustrated in FIG. 20 centered on "0"), and, in contrast, the functions p2, p4 are functions employed over ranges in which the absolute value of parallax D exceeds the specific value. Namely, the function p2 is employed with the function p1 on the plus side of the independent variable f (β, D), and is continuous with the function p1 through the inflection point b2. The function p4 is employed with the function p3 on the minus side of the independent variable f (β, D), and is continuous with the function p3 through the inflection point c2. In the first exemplary embodiment, the maximum value of the operation movement ratio V is predetermined, and so the inflection points b2, c2 are uniquely determined by determining the slope α. The range of the independent variable f (β, D) of the functions p2, p4 (the range of the independent variable f (β, D) over which the maximum value Vst applies) is also determined by determining the inflection points b2, c2. The range of the independent variable f (β, D) over which the maximum value Vst applies for the functions p2, p4 widens as the slope α gets shallower (as the absolute value of the slope α gets smaller).

As explained above, in the imaging device 100 according to the first exemplary embodiment, the operation movement ratio V is determined based on the parallax D and the factor β, and control is performed to move the focusing lens 302 by an amount equivalent to the movement amount determined based on the determined operation movement ratio V and the operation amount. Thus in the imaging device 100 according to the first exemplary embodiment, the focusing lens 302 can be moved at high precision to the focal point quicker than in cases lacking the present configuration (for example, cases in which the operation movement ratio V is determined solely relying on the parallax).

Moreover, in the first exemplary embodiment, over the intervals in which the absolute value of parallax D exceeds a specific value, the control section 12B performs control to move the focusing lens 302 by an amount equivalent to a movement amount determined based on the maximum value Vst of the operation movement ratio V defined by the functions p2, p4, and the operation amount. Reference here to the state in which "the parallax D exceeds a specific value" indicates a state in which the absolute values of parallax D in the example illustrated in FIG. 20, exceeds absolute values of the parallax D included in the independent variable f (β, D) that represent the inflection point b2 or the inflection point c2, and, for example indicates a state in which the parallax is in an undetectable state. Thus in the imaging device 100 according to the first exemplary embodiment, by using a simple configuration, the movement time of the focusing lens 302 to the focal point can be shortened in cases in which the parallax D has exceeded a specific value compared to cases lacking the present configuration. Although an example has been given in the first exemplary embodiment of a case in which the maximum value Vst is employed over intervals in which the parallax D exceeds a specific value, there is no limitation thereto, and the maximum value Vst may, for example, be employed over intervals in which the independent variable f (β, D) (for example, the absolute value of the independent variable f (β, D)) exceeds a specific value.

Moreover, although an example has been given of the state in which "the parallax D exceeds a specific value" as a state in which the parallax is in an undetectable state, the state in which "the parallax D exceeds a specific value" is a state in which the parallax D exceeds a specific parallax range centered on a parallax of "0". The specific parallax range indicates a parallax range, for example, in which the focusing lens 302 would not move through the in-focus position (the position at which the parallax is "0") in cases that assume the focusing lens 302 is moved by an amount equivalent to a standard movement amount of the focusing lens 302, determined based on the maximum value of the operation movement ratio and a standard value of the operation amount. Examples of the standard value of the operation amount include an average value of the operation amounts for single strokes of the focus ring 301 previously performed by the user of the imaging device 100.

Moreover, the slope α has the characteristic of being shallower the larger the factor β. Consequently, the imaging device 100 according to the first exemplary embodiment is capable of determining the operation movement ratio V with higher precision than cases lacking the present configuration.

The determination section 12A may determine as the slope α a value (shallow gradient value) that decreases as the independent variable f (β, D) increases (for example, as the absolute value of the independent variable f (β, D) increases). In such cases, the imaging device 100 according to the first exemplary embodiment is, with a simple configuration, able to determine the operation movement ratio V with higher precision than cases lacking the present configuration.

Moreover, the slope α has the characteristic of making the operation movement ratio V smaller as the independent variable f (β, D) decreases (for example, as the absolute value of the independent variable f (β, D)) gets smaller. Consequently, the imaging device 100 according to the first exemplary embodiment is capable of determining the operation movement ratio V with higher precision than cases lacking the present configuration.

An example has been given in the first exemplary embodiment of a case in which the control section 12B moves the focusing lens 302 by an amount equivalent to a movement amount determined based on the operation movement ratio V defined by the function P including functions p2, p4 and the operation amount; however the present invention is not limited thereto. Namely, in cases in which the parallax D is a specific value or lower, the control section 12B may move the focusing lens 302 by an amount equivalent to a movement amount determined based on the operation movement ratio V defined by a function that is function P excluding the functions p2, p4 (i.e. the function defined by functions p1, p3). In such cases, when the parallax D exceeds a specific value, the control section 12B performs control of the motor 304 to move the focusing lens 302 by an amount equivalent to a movement amount determined based on a predetermined value of the maximum value of the operation movement ratio V and the operation amount.

Moreover, in the first exemplary embodiment, the operation movement ratio V is defined by the control section 12B according to the function P; however the present invention is not limited thereto. For example, the operation movement ratio V may be defined by a function Q illustrated in FIG. 21. The function Q differs from the function P in the point that functions q1 to q4 are included in place of the functions p1 to p4. The functions q1 to q4 are each linear functions. The functions q1, q3 are defined by the following Equation (3). The functions q1, q3 differ from the functions p1, p3 in having a slope α/β instead of the slope α, and in having an independent variable |D| instead of the independent variable f (β, D), with the function q1 corresponding to the function p1, and the function q3 corresponding to the function p3. The functions q2, q4 are functions defined by the maximum value Vst, the function q2 corresponds to the function p2, and the function q4 corresponds to the function p4. Similarly to in function P, in function Q the slope α/β gets smaller (the gradient gets shallower) as the factor β gets larger (the deeper the subject depth of field). As the slope α/β gets smaller, as illustrated in the example in FIG. 21, the functions q1, q3 depicted by the solid lines are displaced to the functions q1, q3 depicted by the dashed lines.

Figure 21:
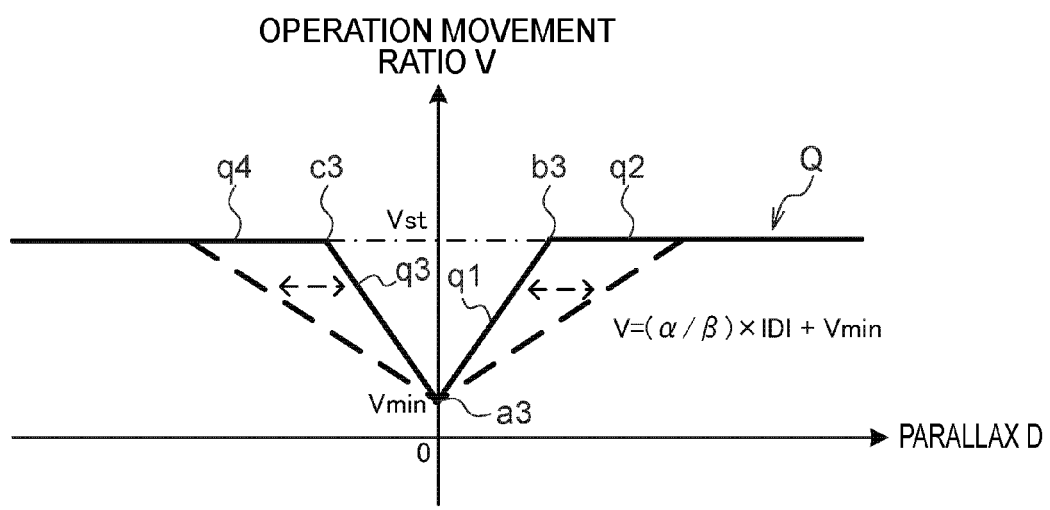
FIG. 21 is a diagram illustrating a (first) modified example of a function for use in lens movement control processing according to the first exemplary embodiment.

As illustrated in the example of FIG. 21, the maximum value Vst is a fixed value similar to in the first exemplary embodiment, however there is no limitation thereto, and the maximum value Vst may be determined based on a specific parameter (for example, at least one out of parallax D or factor β).

Moreover, the functions q1, q3 are determined by the slope α/β, the minimum value Vmin, and the maximum value Vst, however, they may be determined by slope α/β and the inflection points b3, c3 (the inflection points corresponding to each of the positions of the inflection points b1, c1).

In the functions q1, q3, the slope α/β is determined by the parallax D and the factor β similarly to in the first exemplary embodiment, however the present invention is not limited thereto. For example, the determination section 12A may determine the functions q2, q4 and the minimum value Vmin from the parallax D and the factor β, and may determine the function Q by determining the slope α/β from the determined functions q2, q4 and the minimum value Vmin. The determination section 12A may determine the inflection points a3, b3, c3 of the function Q from the parallax D and the factor β, and determine the function Q from the determined inflection points a3, b3, c3. Namely, the operation movement ratio V defined by the function Q may be determined based on at least one out of the maximum value Vst or the minimum value Vmin of the operation movement ratio V, and the independent variable f (β, D) and the slope α/β. These determination methods are also applicable to determining the function P explained in the first exemplary embodiment.

The factor β included in the functions P, Q is not limited to data indicating the position of the focusing lens 302 on the optical axis L1 (for example, one dimensional or two dimensional coordinates). For example, the F number, subject distance, focal point distance, or size (for example the diameter) of the permissible circle of confusion may be employed thereas, or a combination of two or more from data indicating the position of the focusing lens 302 on the optical axis L1, an aperture value, subject distance, focal point distance, or size of the permissible circle of confusion may be employed thereas. Examples of "a combination" include a combination defined by the following Equation (4). In Equation (4), Depth is the subject depth, Fno indicates the F number, f is the focal point distance. Moreover, δ is the diameter of the permissible circle of confusion (a value determined by the pixel pitch of the image pick-up device 20). L is the subject distance. The subject distance is a value computed from the in-focus position and the position of the focusing lens 302. Namely, subject distance may be derived using a table or computation formula representing a correspondence relationship between the position (focus position) Fp of the focusing lens 302 when in a focused state and the subject distance (for example a correspondence relationship matching a focus position Fp of 100 to a focal point of 2 m in front). The focus position Fp matching the focal point of the subject may be derived from the parallax. The subject distance is derived by deriving the distance to the focal point corresponding to the derived focus position Fp.

$$Depth = \frac{\delta \cdot FNO \cdot L^2}{f^2 + \delta \cdot Fno \cdot L} + \frac{\delta \cdot FNO \cdot L^2}{f^2 - \delta \cdot Fno \cdot L} \qquad (4)$$

$V = (\alpha/\beta) \times |D| + V\text{min}$ \qquad Equation (3)

Equation (4) expresses the subject depth, however there is no limitation thereto, and the depth of focal point expressed by the following Equation (5) may be employed. In Equation (5), Depth indicates the depth of focal point.

$$Depth = 2 \times Fno \times \delta \qquad \text{Equation (5)}$$

An explanation has been given in the first exemplary embodiment of an example of a case in which the intercept Vmin is a fixed value, however there is no limitation thereto, and a variable value may be employed. For example, the intercept Vmin may be defined by the Depth of Equation (4) or Equation (5), and may, in such cases, be defined by the following Equation (6). In Equation (6), S is a value determined by the manner of use by a user, a standard speed, etc., and is an appropriately variable value. A standard speed is predetermined for the imaging lenses 16.

$$Vmin = S \times Depth \times standard\ speed \qquad \text{Equation (6)}$$

Figure 22:
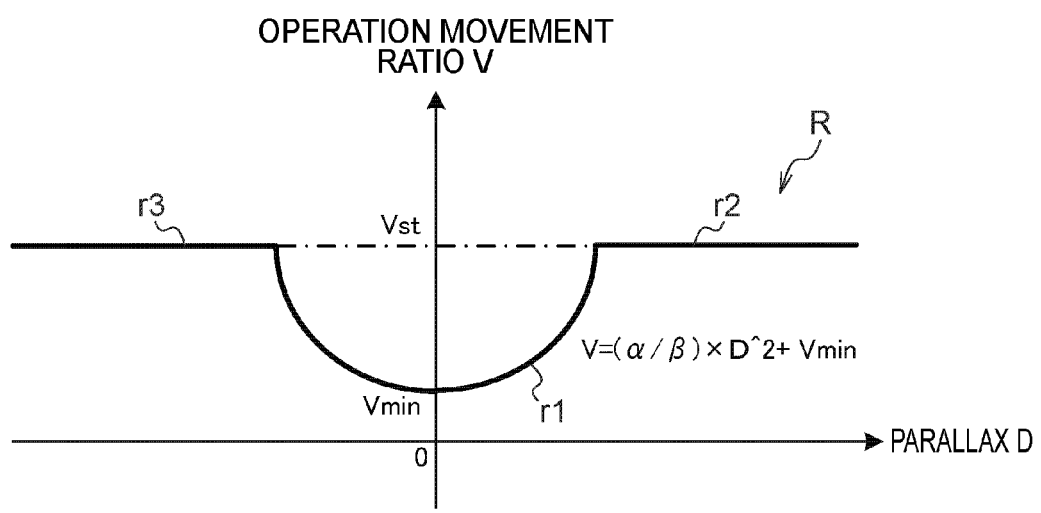
FIG. 22 is a diagram illustrating a (second) modified example of a function for use in lens movement control processing according to the first exemplary embodiment.

The functions P, Q are linear functions, however there is no limitation thereto, and a function including a non-linear function may be employed. FIG. 22 illustrates a function R as an example of a function including a non-linear function. The function R differs from the function P in the point that the functions r1 to r3 are included instead of the functions p1 to p4. The function r1 is a non-linear function defined by the following Equation (7). The function r1 differs from the functions p1, p3 in the point that a coefficient α/β is included instead of the slope α, and an independent variable D^2 is included instead of the independent variable f(β, D). The functions r2, r3 are linear functions defined by the maximum value Vst, and the function r2 corresponds to the function p2, and the function r3 corresponds to the function p4. Similarly to the functions P, Q, in the function R the coefficient α/β is also smaller the larger the factor β.

$$V = (\alpha/\beta) \times D^2 + Vmin \qquad \text{Equation (7)}$$

Figure 23:
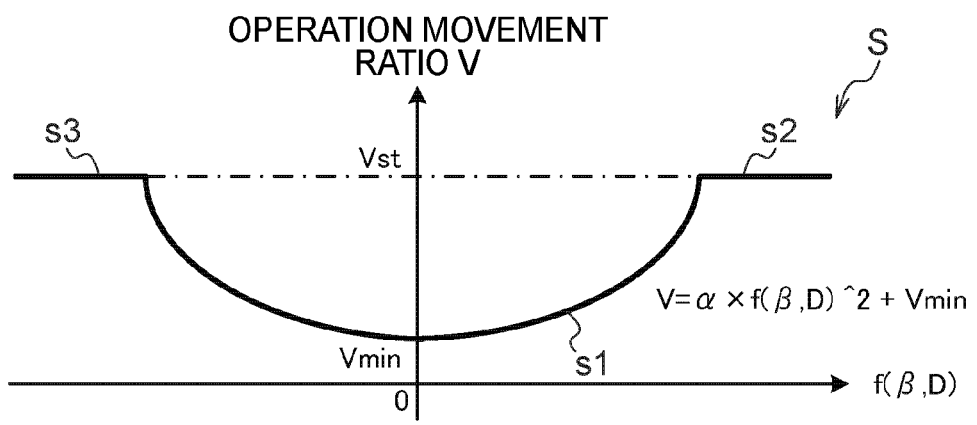
FIG. 23 is a diagram illustrating a (third) modified example of a function for use in lens movement control processing according to the first exemplary embodiment.

A function S may also be employed in place of the function R. FIG. 23 illustrates an example of function S. The function S differs from the function R in the point that the functions s1 to s3 are included instead of the functions r1 to r3. The function s1 is a non-linear function, and is defined by the following Equation (8). The function s1 differs from the function r1 in the point that a coefficient α is included instead of the coefficient α/β, and in the point that the independent variable f (β, D)^2 is included instead of the independent variable D^2. The functions s2, s3 are linear functions defined by the maximum value Vst, the function s2 corresponds to the function r2, and the function s3 corresponds to the function r3. Similarly to in the function R, in the function S the coefficient α is also smaller the larger the factor β.

$$V = \alpha \times f(\beta, D)^2 + Vmin \qquad \text{Equation (8)}$$

In the first exemplary embodiment, the operation movement ratio V is a coefficient for converting a rotation operation amount of the focus ring 301 into a movement amount of the focusing lens 302, however the present invention is not limited thereto. For example, in cases in which the focusing lens 302 is moved by press operation of a push-key using a hardware key or a software key, a coefficient may be employed to convert the push operation amount into the movement amount of the focusing lens 302. In cases in which the focusing lens 302 is moved by sliding a slide member, a coefficient maybe employed to convert the slide amount of the slide member into the movement amount of the focusing lens 302.

The flow of the parallax computation processing (see FIG. 16) and the flow of the lens movement control processing (see FIG. 19) explained in the first exemplary embodiment are merely examples thereof. Accordingly, it goes without saying that steps not required may be eliminated, new steps may be added, and the processing sequence may be rearranged within a range not departing from the spirit. Each type of processing included in the parallax computation processing and lens movement control processing explained for the above first exemplary embodiment may be realized by a software configuration utilizing a computer executing a program, or may be realized by another hardware configuration. Implementation may also be made with a combination of a hardware configuration and a software configuration.

Note that in cases in which at least one out of the parallax computation processing or the lens movement control processing explained in the first exemplary embodiment is implemented by executing a program with a computer, the program may be pre-stored in a specific storage region (for example the memory 26). Initial storage in the memory 26 is not always necessary. For example, a program may first be stored on a freely selectable "portable storage medium" such as a Solid State Drive (SSD), CD-ROM, a DVD disk, a magneto optical disk, or an IC card, employed connected to a computer. A computer may then acquire and execute a program from such a portable storage medium. Each program may also be stored in advance on another computer, server device, or the like connected to a computer through the internet, a Local Area Network (LAN), or the like, such that the computer acquires and executes such programs therefrom.

Second Exemplary Embodiment

Explanation has been given of an example of an embodiment in which movement of the focusing lens 302 is controlled using the operation movement ratio V. In the second exemplary embodiment, explanation follows regarding a case in which force to prevent rotation of the focus ring 301 (referred to below as resistance force) is employed in place of the operation movement ratio V. The same reference numerals are allocated to configuration members explained in the first exemplary embodiment, and further explanation is omitted thereof.

Figure 24:
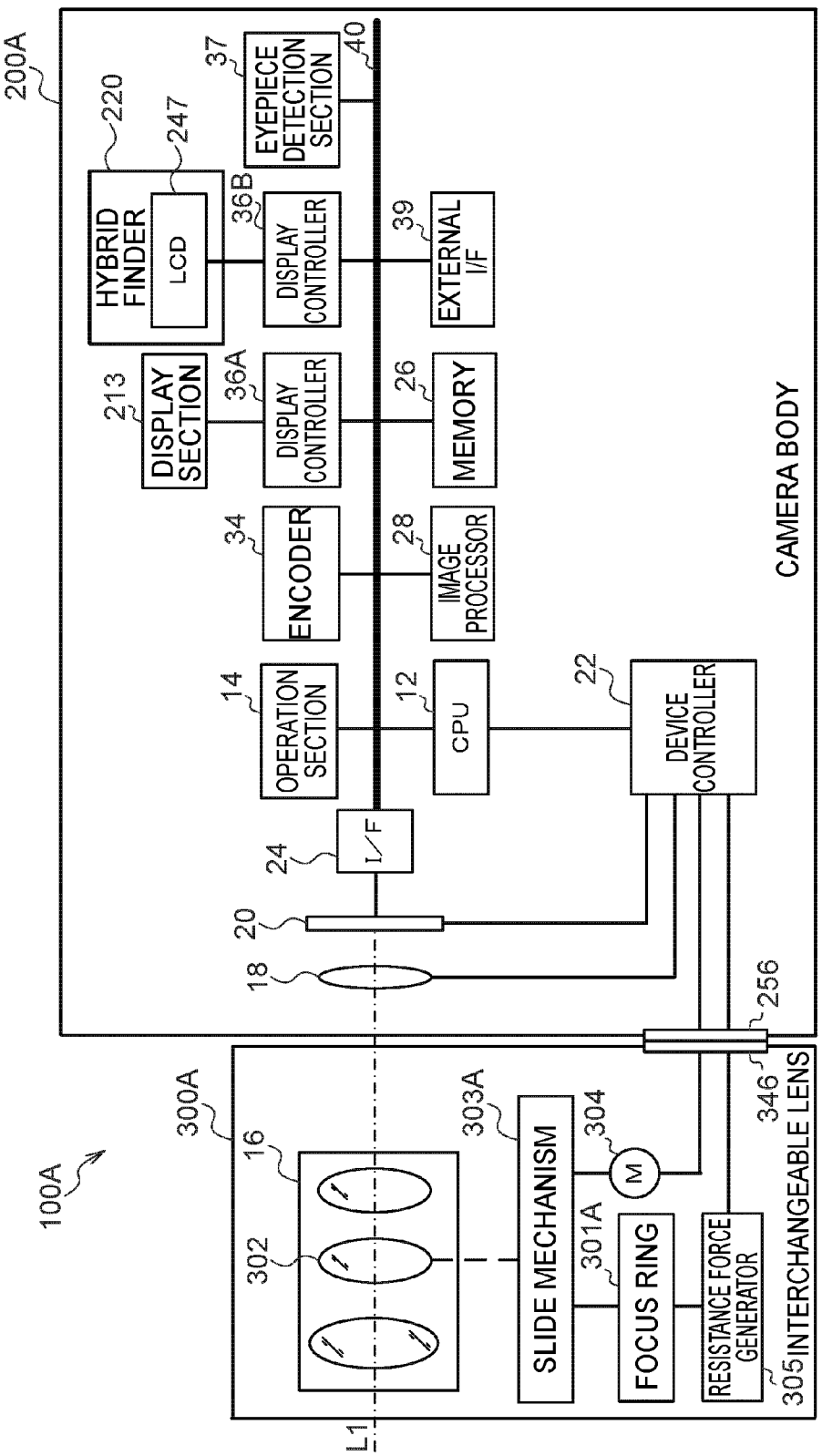
FIG. 24 is a block diagram illustrating an example of a configuration of an electrical system of an imaging device according to a second exemplary embodiment.

FIG. 24 illustrates an example of a configuration of an imaging device 100A according to the second exemplary embodiment. The imaging device 100A illustrated in FIG. 24 differs from the imaging device 100 explained in the first exemplary embodiment in the point that an interchangeable lens 300A is included instead of the interchangeable lens 300, and in the point that a camera body 200A is included instead of the camera body 200.

The interchangeable lens 300A differs from the interchangeable lens 300 explained in the first exemplary embodiment in that a slide mechanism 303A is included instead of the slide mechanism 303, and a focus ring 301A is included instead of the focus ring 301. The interchangeable lens 300A differs from the interchangeable lens 300 explained in the first exemplary embodiment in the point that a resistance force generator 305 is included.

The slide mechanism 303A differs from the slide mechanism 303 in the point that the slide mechanism 303A is connected to the focus ring 301A. The slide mechanism 303A is equipped with the functions of the slide mechanism 303, and operates accompanying rotation operation of the focus ring 301A. The focusing lens 302 is moved by the slide mechanism 303A in the optical axis L1 direction accompanying rotational operation of the focus ring 301A.

The resistance force generator 305 is connected to the focus ring 301A. The resistance force generator 305 generates resistance force (for example, load torque imparted to the focus ring 301A). The resistance force generator 305 includes an actuator (for example, a piezoelectric device) and controls resistance force by controlling the operation of the actuator. The resistance force generator 305 is connected to the device controller 22 through the mounts 256, 346, and is controlled by the CPU 12 through the device controller 22. Namely, the resistance force of the focus ring 301A is controlled by the CPU 12 through the resistance force generator 305.

Figure 25:
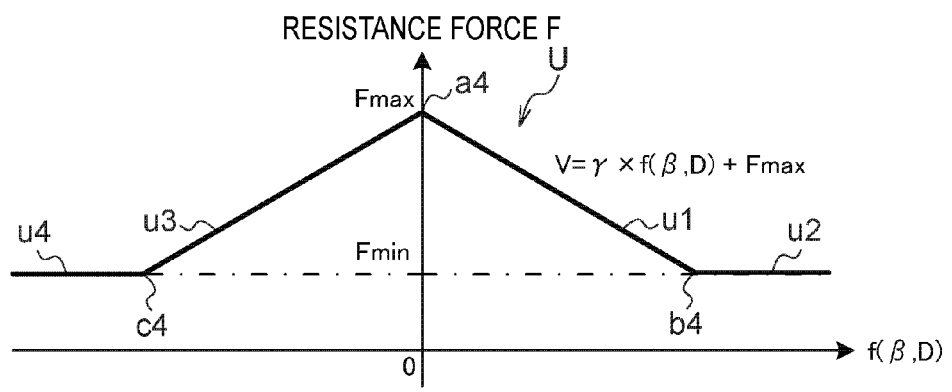
FIG. 25 is a diagram illustrating an example of a function for use in lens movement control processing according to the second exemplary embodiment.

In lens movement control processing according to the second exemplary embodiment, a function U illustrated as an example in FIG. 25 is employed instead of the function P used in the lens movement control processing explained in the first exemplary embodiment. Namely, in the imaging device 100A according to the second exemplary embodiment, the focusing lens 302 is moved by an amount equivalent to a movement amount determined based on a resistance force determined by the function U, and an operation force and an operation time on the focus ring 301.

FIG. 25 illustrates an example of a function U for defining the resistance force. As illustrated in FIG. 25, the function U is defined by functions u1 to u4 that are linear functions. The following Equation (9) illustrates functions u1, u3. Equation (9) illustrates a first order function in which $\gamma$ is the slope, $f(\beta, D)$ is an independent variable determined by a function of the factor $\beta$ and the parallax D, the resistance force F is a dependent variable, and the maximum value of the resistance force F, Fmax, is the intercept. In order to avoid confusion, the example of the independent variable $f(\beta, D)$ employed here has the factor $\beta$ and the parallax D as independent variables, and the dependent variable employed is a variable of a function that increases in value the larger the factor $\beta$ and the parallax D. Moreover, a fixed value is employed as the intercept Fmax to avoid confusion, however a variable value may be employed that varies according to the various conditions (for example, the parallax D and the factor $\beta$).

$$F = \gamma \times f(\beta, D) + F\text{max} \qquad \text{Equation (9)}$$

The slope $\gamma$ is a coefficient uniquely determined by the parallax and the factor acquired by the CPU 12, and represents a coefficient for converting the independent variable $f(\beta, D)$ into units of resistance force F.

Moreover, the gradient of the functions u1, u3 expressed by the slope $\gamma$ becomes shallower as the factor $\beta$ increases. Namely, the absolute value of the slope $\gamma$ has the characteristic of getting smaller as the factor $\beta$ increases (the slope $\gamma$ has a shallower gradient the larger the factor $\beta$). An example is given in the second exemplary embodiment of a case in which the gradient of the functions u1, u3 expressed by the slope $\gamma$ has the characteristic of becoming shallower as the factor $\beta$ increases; however, the present invention is not limited thereto. For example, the gradient of the functions u1, u3 expressed by the slope $\gamma$ may have the characteristic of becoming shallower as the independent variable $f(\beta, D)$ increases. Namely, the slope $\gamma$ may have the characteristic of having smaller absolute values as the independent variable $f(\beta, D)$ including the parallax stored in the specific storage region of the memory 26 as the parallax D (for example, the absolute values of the independent variable $f(\beta, D)$) gets larger.

The slope $\gamma$ of function u1 is a negative value, and the slope $\gamma$ of the function u3 is a positive value, and both cases have the characteristic of the resistance force F being larger the smaller the absolute values of the independent variable $f(\beta, D)$. The function u1 and the function u3 are continuous through an inflection point a4 at a position of (0, Fmax).

The slope $\gamma$ having the above characteristic is, for example, determined by the determination section 12A based on the independent variable $f(\beta, D)$, and the functions u1, u3 are determined by the determined slope $\gamma$ and a predetermined intercept Vmin.

The functions u1, u3 are functions employed for absolute values of parallax D of a specific value or lower (in this example within a specific range centered on the independent variable $f(\beta, D)$ of "0"), and, in contrast, the functions u2, u4 are functions employed in a range in which the parallax D exceeds the specific value. Namely, the function u2 is employed together with the function u1 on the plus side of the independent variable $f(\beta, D)$, and is continuous with the function u1 through the inflection point b4. The function u4 is a function employed together with the function u3, and is continuous with the function u3 through the inflection point c4. The minimum value of the resistance force F is predetermined in the second exemplary embodiment, and so the inflection points b4, c4 are uniquely determined by determining the slope $\gamma$. The range of the independent variable $f(\beta, D)$ of the functions u2, u4 (the range of the independent variable $f(\beta, D)$ over which the minimum value Fmin is applied) is also determined by determining the inflection points b4, c4. The range of the independent variable $f(\beta, D)$ over which the minimum value Fmin is applied for the functions u2, u4 widens as the slope $\gamma$ gets shallower (as the absolute value of the slope $\gamma$ gets smaller).

As described above, in the second exemplary embodiment, the resistance force F is determined based on the parallax D and the factor $\beta$, and the focusing lens 302 is moved by an amount equivalent to a movement amount determined based on the determined resistance force F, and the operation force and operation time on the focus ring 301. The imaging device 100A according to the second exemplary embodiment is thereby capable of moving the focusing lens 302 to the in-focus position with high precision faster than in cases lacking the present configuration (for example, a case in which the resistance force F is determined solely relying on the parallax).

Figure 26:
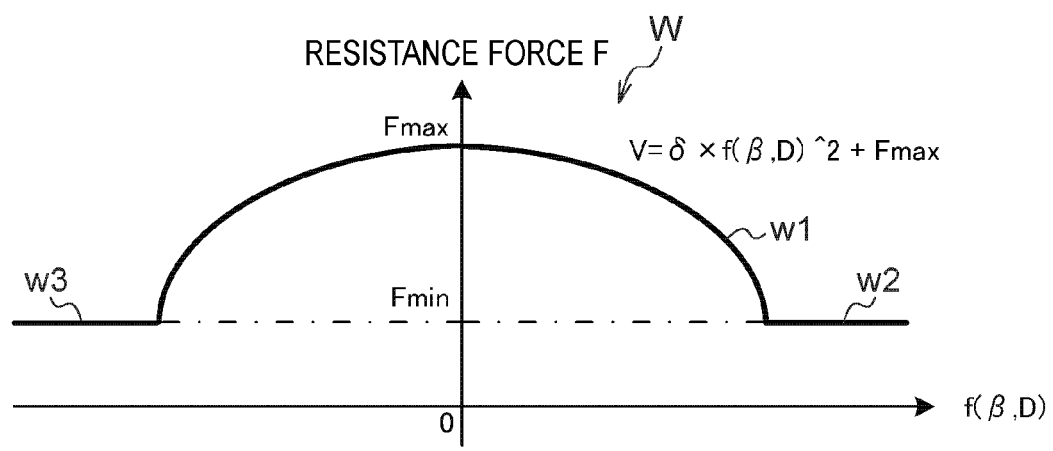
FIG. 26 is a diagram illustrating a (first) modified example of a function for use in lens movement control processing according to the second exemplary embodiment.

The function U is a linear function, however there is no limitation thereto, and a function including a non-linear function may be employed. FIG. 26 illustrates a function W as an example of a function including a non-linear function. The function W differs from the function U in the point that functions w1 to w3 are included instead of the functions u1, u3. The function w1 is a non-linear function, and is defined by the following Equation (10). The function w1 differs from the functions u1, u3 in including a coefficient 6 instead of the slope 6, and in the point that an independent variable $f(\beta, D)^2$ is included instead of the independent variable $f(\beta, D)$. The functions w2, w3 are linear functions defined by the minimum value Fmin, the function w2 corresponds to the function u2, and the function w3 corresponds to the function u4. Similarly to the function U, in the function W the coefficient $\gamma$ is smaller the larger the factor $\beta$.

$$F = \delta \times f(\beta, D)^2 + F\text{max} \qquad \text{Equation (10)}$$

Third Exemplary Embodiment

In each of the above exemplary embodiments, an example is given of the imaging device 100 (100A), however mobile terminal devices that are modified examples of the imaging device 100 include mobile phones and smartphones including a camera function, personal digital assistants (PDAs) and mobile gaming machines. Detailed explanation follows in the third exemplary embodiment regarding an example of a smartphone, with reference to the drawings.

Figure 27:
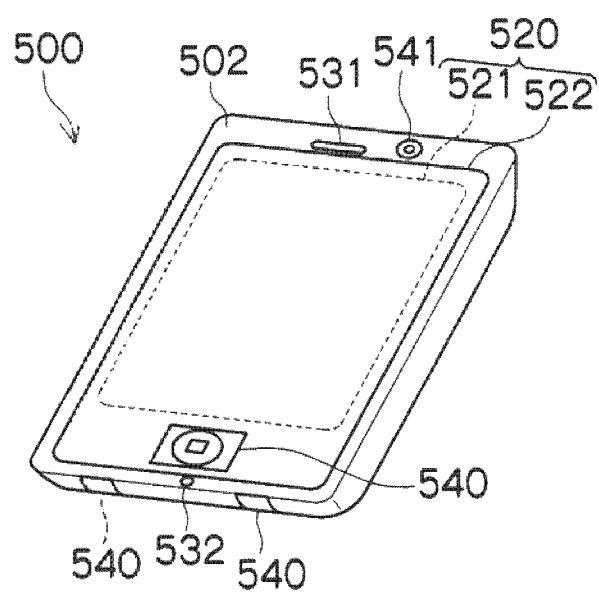
FIG. 27 is a perspective view illustrating an example of the external appearance of a smartphone according to a third exemplary embodiment.

FIG. 27 is a perspective view illustrating an example of the external appearance of a smartphone 500. The smartphone 500 illustrated in FIG. 27 includes a flat plate shaped casing 502, and a display and input section 520 provided on one face of the casing 502 and integrating together a display panel 521 serving as a display section and an operation panel 522 serving as an input section. The casing 502 includes a speaker 531, a microphone 532, an operation section 540, and a camera section 541. Note that the configuration of the casing 502 is not limited thereto, and, for example, a configuration may be employed in which the display section and the input section are provided independently from each other, and a configuration including a folding structure or a sliding structure may also be employed.

Figure 28:
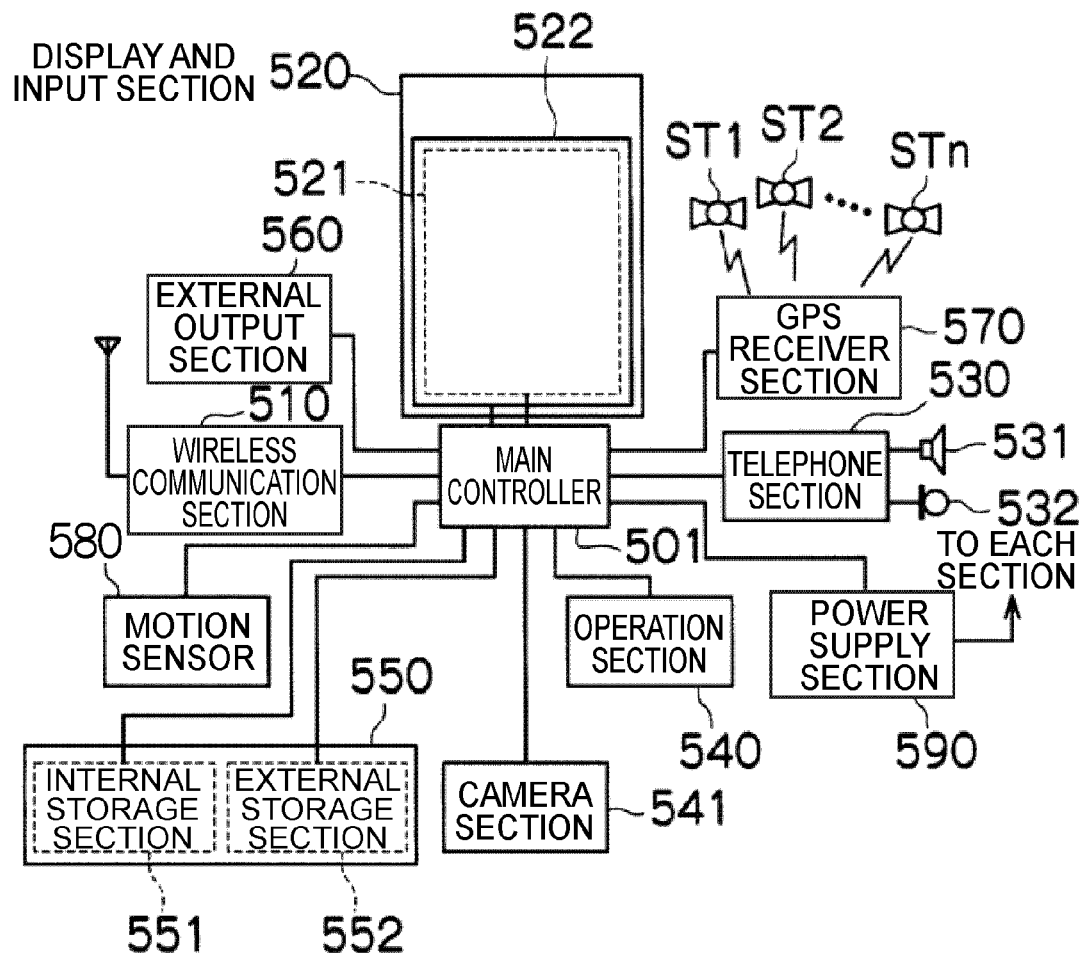
FIG. 28 is a block diagram illustrating an example of relevant configuration of an electrical system of a smartphone according to the third exemplary embodiment.

FIG. 28 is a block diagram illustrating an example of a configuration of the smartphone 500 illustrated in FIG. 27. As illustrated in FIG. 28, main configuration elements of the smartphone 500 include a wireless communication section 510, the display and input section 520, a telephone section 530, the operation section 540, the camera section 541, a storage section 550, and an external input-output section 560. Main configuration elements of the smartphone 500 also include a Global Positioning System (GPS) receiver section 570, a motion sensor 580, a power supply section 590, and a main controller 501. Main functions of the smartphone 500 include a wireless communication function that performs mobile wireless communication through a base station device BS and a mobile communication network NW.

The wireless communication section 510 performs wireless communication with the base station device BS installed in the mobile communication network NW according to instructions from the main controller 501. Transmission and reception of various types of file data, such as voice data and image data, email data etc., and reception of web data, streaming data, and the like is performed using the wireless communication.

The display and input section 520 is what is referred to as a touch panel, and includes the display panel 521 and the operating panel 522. Thus, according to control by the main controller 501, the display and input section 520 transmits information to a user visibly by displaying images (still images and video images), text data, and the like, and also detects user operation in response to the displayed information. The display panel 521 is preferably a 3D display panel in cases in which generated 3D is viewed.

The display panel 521 employs a display device such as an LCD, or an organic electroluminescence display (OELD). The operating panel 522 is a device that is installed such that an image displayed on the display screen of the display panel 521 is visible, and detects one or plural coordinates operated by a user finger or stylus. A detection signal generated by operation when such a device is operated by a user finger or stylus is output to the main controller 501. The main controller 501 then detects the operation position (coordinates) on the display panel 521 based on the detection signal received.

As illustrated in FIG. 27, the display panel 521 and the operation panel 522 of the smartphone 500 are integrated together to configure the display and input section 520, and the operation panel 522 is disposed so as to entirely cover the display panel 521. In cases in which such a placement is adopted, the operation panel 522 may include a function to detect user operation even in a region outside of the display panel 521. In other words, the operation panel 522 may include a detection region for a superimposed section superimposed on the display panel 521 (referred to below as the display region), and a detection region for an outer edge section other than the above that is not superimposed on the display panel 521 (referred to below as the non-display region).

The size of the display region and the size of the display panel 521 may completely match each other, however they do not necessarily match each other. The operating panel 522 may include two sensitive regions, at the outer edge section and at an inside portion other than the outer edge section. The width of the outer edge section is appropriately designed according to the size of the casing 502 and the like. Moreover, as a position detection method employed in the operating panel 522, any of, for example, a matrix switch method, a resistance film method, a surface acoustic wave method, an infrared radiation method, an electromagnetic induction method, an electrostatic capacitance method, or the like may be adopted.

The telephone section 530 includes the speaker 531 and the microphone 532. The telephone section 530 converts the voice of the user input through the microphone 532 into voice data capable of being processed by the main controller 501, then outputs this to the main controller 501. The telephone section 530 decodes voice data received by the wireless communication section 510 or by the external input-output section 560, and outputs the voice data from the speaker 531. As illustrated in FIG. 27, for example, the speaker 531 may be installed in the same face as the face at which the display and input section 520 is provided, and the microphone 532 may be installed at a side face of the casing 502.

The operation section 540 is a hardware key that employs a key switch or the like, and is a section that receives instructions from a user. For example, as illustrated in FIG. 27, the operation section 540 is installed to a side face of the casing 502 of the smartphone 500, and is a push-button type switch that is switched ON by depressing with a finger or the like, and is switched to an OFF state when the finger is removed by restoring force, such as from a spring.

The storage section 550 is stored with a control program and control data for the main controller 501, application software, address data that corresponds names against telephone numbers of communication partners, and data of sent and received emails. The storage section 550 stores web data downloaded by web browsing, and downloaded content data. The storage section 550 also temporarily stores streaming data and the like. The storage section 550 includes an internal storage section 551 installed within the smartphone, and an external storage section 552 including a detachable external memory slot. The internal storage section 551 and the external storage section 552 configuring the storage section 550 are implemented using a storage medium, such as a flash memory type or a hard disk type. Other examples that may be employed as the storage medium include a multimedia card micro type, a card type memory (such as a MICRO SD (registered trademark) memory or the like), Random Access Memory (RAM), or Read Only Memory (ROM).

The external input-output section 560 serves the role of an interface to all external devices coupled to the smartphone 500, and is employed for communication and the like with other external devices, or for direct or indirect connection by a network. Examples of communication or the like with other external devices include a universal serial bus (USB), and IEEE1394. Examples of networks include the internet, wireless LAN, BLUETOOTH (registered trademark), radio frequency identification (RFID), and infrared data association (IrDA, (registered trademark)) communication. Other examples of networks include ULTRA WIDEBAND (UWB, (registered trademark)), and ZIGBEE (registered trademark).

External devices coupled to the smartphone 500 include, for example, wired/wireless headsets, wired/wireless external chargers, a wired/wireless data port, and/or a memory card connected through a card socket. Other examples of external devices include a subscriber identity module (SIM) card, a user identity module (UIM) card, and an external audio/video device connected through an audio/video input/output (I/O) terminal. Examples of other external audio/video devices include wirelessly connected external audio/video devices. In place of an external audio/video device, for example, a wired/wirelessly connected smartphone, a wired/wirelessly connected personal computer, a wired/wirelessly connected PDA, or earphones or the like may also be applied.

The external input-output section is capable of transmitting received data transmitted by such external devices to each of the configuration elements within the smartphone 500, and capable of transmitting data within the smartphone 500 to the external devices.

Under instruction from the main controller 501, the GPS receiver section 570 receives GPS signals transmitted from GPS satellites ST1 to STn and executes position computation processing based on plural received GPS signals to detect the position in latitude, longitude, and altitude of the smartphone 500. The GPS receiver section 570 is also capable of detecting the position by using positional data when it is possible to acquire positional data from the wireless communication section 510 or the external input-output section 560 (such as a wireless LAN).

The motion sensor 580 includes, for example, a triaxial acceleration sensor, and detects physical movement of the smartphone 500 according to instruction from the main controller 501. The movement direction and acceleration of the smartphone 500 is detected by detecting the physical movement of the smartphone 500. The detection result is output to the main controller 501.

The power supply section 590 supplies electrical power accumulated in a battery (omitted from illustration in the drawings) to each of the sections of the smartphone 500 under instruction from the main controller 501.

The main controller 501 includes a microprocessor, and operates according to a control program and control data stored in the storage section 550 so as to integrally control each of the sections of the smartphone 500. In order to perform voice communication and data communication through the wireless communication section 510, the main controller 501 includes a mobile communication control function that controls each of the sections of the communication system, and an application processing function.

The application processing function is implemented by the main controller 501 operating according to application software stored in the storage section 550. Examples of application processing functions include an infrared communication function that controls the external input-output section 560 to perform data communication with a counterparty device, an email function that performs email transmission and reception, and a web browsing function that views web pages.

The main controller 501 includes an image processing function that displays a picture on the display and input section 520, or the like, based on image data (still image or video image data) such as received data or downloaded streaming data. The image processing function is a function in which the main controller 501 decodes the above image data, subjects the decoded result to image processing, and displays the image on the display and input section 520.

The main controller 501 also executes display control of the display panel 521, and operation detection control to detect user operation through the operation section 540 and the operating panel 522.

By executing display control the main controller 501 displays icons to startup application software, and software keys such as scroll bars, or displays windows to generate emails. Scroll bars are software keys to receive instructions to move the display portion of an image, such as large images that cannot be accommodated within the display region of the display panel 521.

By executing the operation detection control, the main controller 501 detects user operation through the operation section 540, and receives, through the operating panel 522, input of operations to the above icons, and input of character sequences to the entry field of the above window. By execution of the operation detection control, the main controller 501 receives scroll demands for display images through the scroll bar.

Moreover, by executing the operation detection control, the main controller 501 determines whether the operation position on the operating panel 522 is in the superimposed section superimposed on the display panel 521 (display region), or in the other outer edge section not superimposed on the display panel 521 (non-display region). The main controller 501 also includes a touch panel control function to receive the determination result, and to control the sensitive region of the operating panel 522 and the display position of the software key.

The main controller 501 detects gesture operations to the operating panel 522, and is capable of executing a preset function according to the detected gesture operation. Gesture operation does not mean a simple conventional touch operation, and means tracing a track with a finger or the like, specifying plural positions at the same time, or combinations thereof, and means an operation to trace a track of at least one from plural positions.

The camera section 541 is a digital camera that captures an image using an image pick-up device such as a CMOS or CCD, and includes functions similar to those of the imaging device 100 as illustrated in FIG. 1 etc.

Moreover, the camera section 541 is capable of switching between a manual focus mode and an autofocus mode. When the manual focus mode has been selected, focusing of the imaging lens of the camera section 541 can be performed by operating a focusing icon button or the like displayed on the operation section 540 or the display and input section 520. For example, in the main controller 501 serving as an example of an operation amount determination section, an operation amount to instruct for movement of the focusing lens 302 is determined based on contact operation detected by the operating panel 522 serving as an example of a detection section while in manual focus mode (an example of a movement instruction time). For example, the operation amount may be determined based on the number of times contact is made with the icon button or the like, pressing force of contact operation with the icon button or the like, or the continuous contact time with the icon button or the like. Control is then performed to move the focusing lens 302 by an amount equivalent to a movement amount determined based on the determined operation amount and the operation movement ratio.

While in manual focus mode, a live view image synthesized with the split-image is displayed on the display panel 521, thereby enabling the state of focus to be checked during manual focusing. The HYBRID FINDER 220 illustrated in FIG. 12 may be provided to the smartphone 500.

The camera section 541, under control of the main controller 501, converts image data obtained by imaging into, for example, compressed image data such as joint photographic coding experts group (JPEG). Then the image data obtained by conversion can be stored in the storage section 550, and output through the input-output section 560 and the wireless communication section 510. In the smartphone 500 illustrated in FIG. 27, the camera section 541 is installed to the same face as the display and input section 520; however the installation position of the camera section 541 is not limited thereto, and installation may be made to the back face of the display and input section 520, or plural of the camera sections 541 may be installed. In cases in which plural of the camera sections 541 are installed, image capture may be performed independently by switching the camera section 541 for imaging, or imaging may be performed using plural of the camera sections 541 at the same time.

The camera section 541 may also be utilized by various functions of the smartphone 500. For example, images acquired with the camera section 541 may be displayed on the display panel 521, and an image of the camera section 541 may be utilized as operation input to the operating panel 522. During position detection by the GPS receiver section 570, the position may be detected with reference to an image from the camera section 541. Moreover, the optical axis direction of the camera section 541 of the smartphone 500 may be determined and the present usage environment may be determined by reference to an image from the camera section 541, either without using the triaxial acceleration sensor, or in combination with using the triaxial acceleration sensor. Obviously an image from the camera section 541 may be utilized in application software.

It is also possible for various data to be added to the image data of still images or video images and stored in the storage section 550, and output through the input-output section 560 and the wireless communication section 510. Reference here to "various data" is, for example, positional data acquired by the GPS receiver section 570, and voice data acquired by the microphone 532 (which may be text data to arising from speech-to-text conversion performed by the main controller or the like), for adding to image data of still images or video images. It may moreover be orientation data or the like acquired by the motion sensor 580.

Although in each of the above exemplary embodiments an example has been given in which the split-images are divided in two in the up-down direction, there is no limitation thereto, and a split-image configuration may be applied of an image divided into plural divisions along the left-right direction or a diagonal direction.

Figure 29:
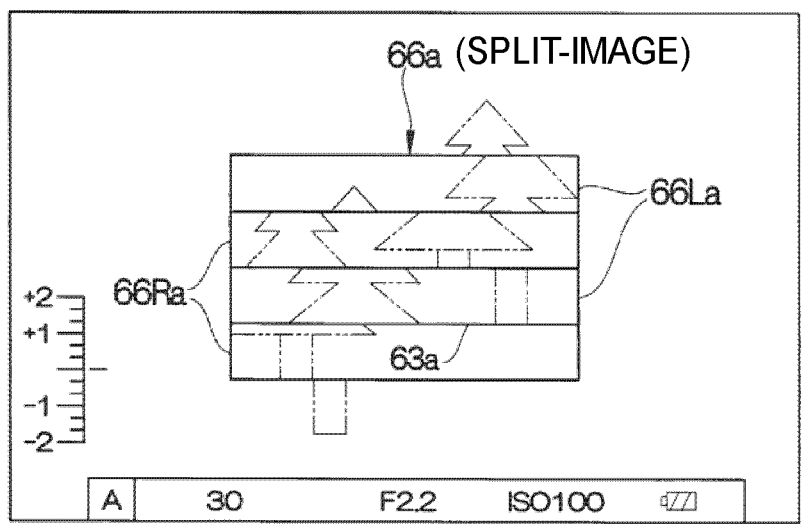
FIG. 29 is a schematic diagram illustrating a modified example of a split-image according to the first to the third exemplary embodiments, and is an example of a split-image formed by splitting and placing alternate odd lines and even lines of a first image and a second image in a row.

For example, a split-image 66a illustrated in the example in FIG. 29 is divided into odd numbered lines and even numbered lines by plural dividing lines 63a parallel to the row direction. In the split-image 66a, line shaped (for example strip shaped) phase difference images 66La generated based on the output signal output from the first pixel group are displayed on the odd numbered lines (or on the even numbered lines). Line shaped (for example strip shaped) phase difference images 66Ra generated based on the output signal output from the second pixel group are displayed on the even numbered lines.

Figure 30:
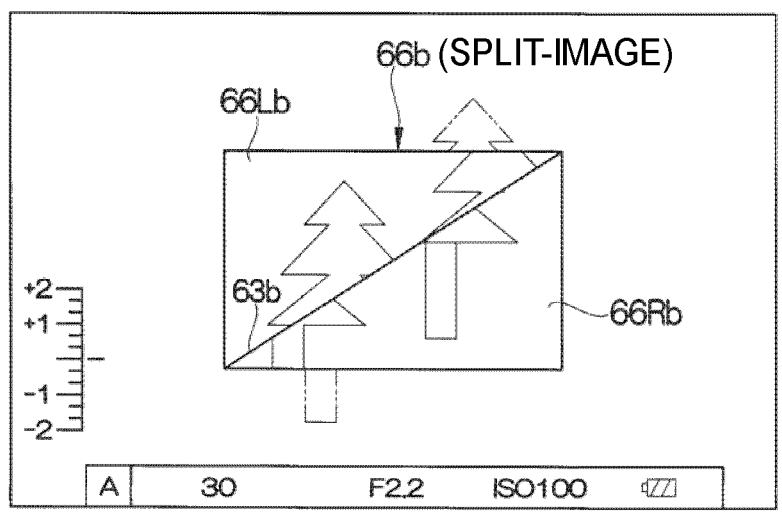
FIG. 30 is a schematic diagram illustrating a modified example of a split-image according to the first to the third exemplary embodiments, and is an example of a split-image divided along a sloping dividing line inclined with respect to a row direction.

A split-image 66b illustrated in FIG. 30 is divided into two by a dividing line 63b with slope angled with respect to the row direction (for example a diagonal line of the split-image 66b). In the split-image 66b, a phase difference image 66Lb generated based on the output signal output from the first pixel group is displayed in one region. A phase difference image 66Rb generated based on the output signal output from the second pixel group is displayed in the other region.

Figure 31A:
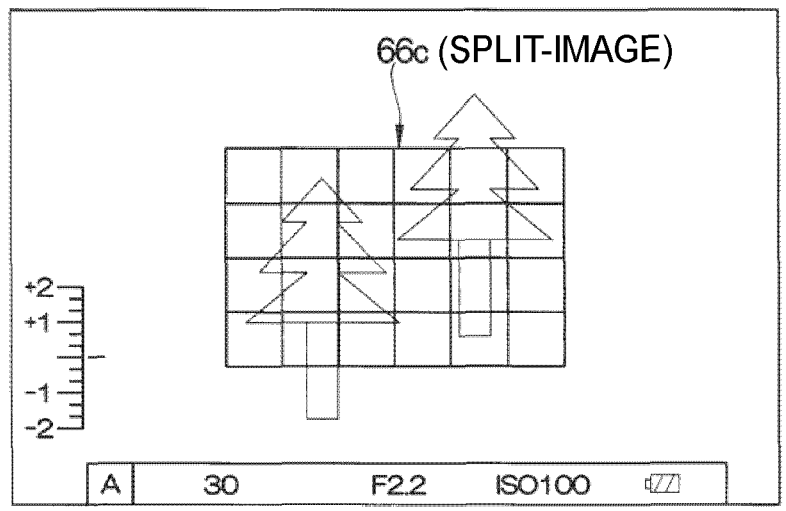
FIG. 31A is a schematic diagram illustrating a modified example of a split-image according to the first to the third exemplary embodiments, and is an example of a split-image divided by lattice shaped dividing lines.
Figure 31B:
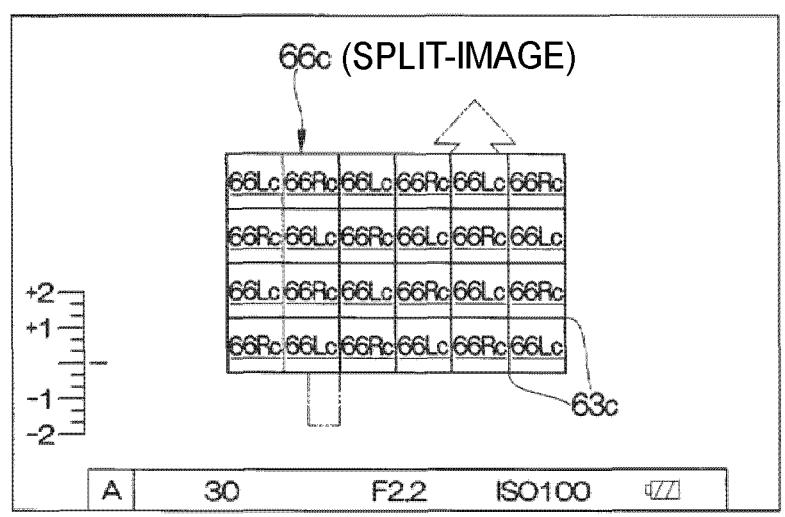
FIG. 31B is a schematic diagram illustrating a modified example of a split-image according to the first to the third exemplary embodiments, and is an example of a split-image formed in a chess-board pattern.

A split-image 66c illustrated in FIG. 31A and FIG. 31B is divided by lattice shaped dividing lines 63c parallel to the row direction and column direction, respectively. In the split-image 66c, a phase difference image 66Lc generated based on the output signals output from the first pixel group is displayed arranged in a chess board pattern (checkered pattern). A phase difference image 66Rc generated based on an output signal output from the second pixel group is also displayed arranged in a chess board pattern.

Moreover, there is no limitation to a split-image, and another focus verification image may be generated from the two phase difference images, and the focus verification image displayed. For example, the two phase difference images may be superimposed on each other in a synthesized display, so as to display as a double image when not in focus and to display as a clear image when in a focused state.

In each of the above exemplary embodiments, an example is given in which the image pick-up device 20 includes the first to third pixel groups, however the present invention is not limited thereto, and an image pick-up device configured from only a first pixel group and a second pixel group may be employed. A digital camera including such a type of image pick-up device is capable of generating a three dimensional image (3D image) based on the first image output from the first pixel group and the second image output from the second pixel group, and is also capable of generating a two dimensional image (2D image). In such cases, generation of the two dimensional image is, for example, performed by interpolation processing between pixels of the same color in each of the first image and the second image. The first image or the second image may also be employed as the two dimensional image without performing interpolation processing.

In each of the above exemplary embodiments, examples have been given in which both the normal image and the split-image are displayed at the same time on the same screen of a display device when the first to the third images are input to the image processor 28, however the present invention is not limited thereto. For example, the display control section 36 may control so as to inhibit display of the normal image on the display device, and to display the split-image on the display device. Reference here to "inhibit . . . display of the normal image" means, for example, such that the normal image is not displayed on the display device. More specifically, it means not displaying the normal image on the display device by not outputting the normal image to the display device even though the normal image is generated, and also not displaying the normal image on the display device by not generating the normal image. The split-image may also be displayed on the display device by using the whole of the screen, or the split-image may be displayed by using the whole of a split-image display region as illustrated as an example in FIG. 15. Reference here to "split-image" is, for example, in cases in which a specific image pick-up device is employed, a split-image based on images output from phase difference pixel groups (for example the first image output from the first pixel group and the split-image output from the second pixel group). An example of "cases in which a specific image pick-up device is employed" is a case in which an image pick-up device is employed that is configured by only phase difference pixel groups (for example the first pixel group and the second pixel group). Another example is a case in which an image pick-up device is employed that has phase difference pixels (for example the first pixel group and the second pixel group) arranged at a specific proportion with respect to the normal pixels.

Moreover, there are various conceivable conditions as conditions to inhibit display of the normal image and to display the split-image. For example, the display control section 36 may perform control to display the split-image without displaying the normal image on the display device in cases in which a normal image display instruction is cancelled in a state in which display of a split-image is being instructed. Moreover, for example, the display control section 36 may perform control to display the split-image without displaying the normal image on the display device in cases in which a photographer is looking into the HYBRID FINDER. Moreover, for example, the display control section 36 may perform control to display the split-image without displaying the normal image on the display device in cases in which the release button 211 is in a half pressed state. Moreover, for example, the display control section 36 may perform control to display the split-image without displaying the normal image on the display device in cases in which press operation of the release button 211 is not being performed. Moreover, for example, the display control section 36 may perform control to display the split-image without displaying the normal image on the display device in cases in which a face detection function has been activated to detect faces in a subject-image.

The invention claimed is:

1. An image processing device comprising:
    an image acquisition section that acquires first and second images, based on first and second image signals that are output from an image pick-up device that includes first and second pixel groups that output the first and second image signals due to respective images being formed by a pupil-divided subject-image that has passed through first and second regions of an imaging lens that includes a focusing lens that is moveable along an optical axis direction;
    a movement section that moves the focusing lens in the optical axis direction;
    a parallax computation section that computes parallax indicating a displacement amount between each pixel in the first image that is acquired by the image acquisition section and each respective corresponding pixel in the second image that is acquired by the image acquisition section;
    a determination section that, based on a factor defining a depth representing a permissible range for an acceptable state of focus and based on the parallax computed by the parallax computation section, determines an operation movement ratio, for converting an operation amount, that instructs movement of the focusing lens, into a movement amount of the focusing lens, by using a function including the operation movement ratio as a dependent variable and an independent variable determined according to the factor and the parallax;
    a control section that controls the movement section to move the focusing lens by an amount equivalent to the movement amount determined based on the operation movement ratio determined by the determination section and based on the operation amount;
    a generation section that generates a first display image based on an image signal that is output from the image pick-up device, and generates a second display image for use in focus verification based on the first and second images;
    a display section that displays images; and
    a display controller that performs control to display the first display image, that is generated by the generation section, on the display section, and to display the second display image, that is generated by the generation section, within a display region of the first display image.

2. The image processing device of claim 1, wherein the operation movement ratio becomes larger as the depth determined by the factor becomes larger.

3. The image processing device of claim 1, wherein, during an interval in which the parallax exceeds a specific value, the control section further controls the movement section to move the focusing lens by an amount equivalent to the movement amount determined based on a predetermined value for a maximum value of the operation movement ratio and based on the operation amount.

4. The image processing device of claim 3, wherein, during an interval in which the parallax is in an undetectable state, the control section controls the movement section to move the focusing lens by an amount equivalent to the movement amount determined based on a predetermined value as a maximum value of the operation movement ratio and based on the operation amount.

5. The image processing device of claim 1, wherein the factor is determined based on at least one item selected from the group consisting of data representing a current position of the focusing lens on the optical axis, an aperture number, a subject distance, a focal point distance and a size of a permissible circle of confusion.

6. The image processing device of claim 1, wherein:
    the image pick-up device further includes a third pixel group, on which an image of a subject-image that has passed through the imaging lens is formed without being pupil-divided and which outputs a third image signal; and
    the generation section generates the first display image based on the third image signal that is output from the third pixel group.

7. The image processing device of claim 1, further comprising:
    a detection section that detects a contact operation to an operation screen; and
    an operation amount determination section that determines the operation amount based on the contact operation detected by the detection section during a movement instruction period for instructing movement of the focusing lens.

8. The image processing device of claim 1, wherein:
    the dependent variable increases as the independent variable increases within a range of absolute values of the parallax being a specific value or lower, with a degree of increase becoming smaller as the independent variable increases.

9. The image processing device of claim 8, wherein:
    the dependent variable increases as the factor and the parallax increase within the range of absolute values of the parallax being a specific value or lower; and the degree becomes smaller as the factor and the parallax increase.

10. An image processing device comprising:
an image acquisition section that acquires first and second images, based on first and second image signals that are output from an image pick-up device that includes first and second pixel groups that output the first and second image signals due to respective images being formed by a pupil-divided subject-image that has passed through first and second regions of an imaging lens that includes a focusing lens that is moveable along an optical axis direction;
a movement section that moves the focusing lens in the optical axis direction;
a parallax computation section that computes parallax indicating a displacement amount between each pixel in the first image that is acquired by the image acquisition section and each respective corresponding pixel in the second image that is acquired by the image acquisition section;
a determination section that, based on a factor defining a depth representing a permissible range for an acceptable state of focus and based on the parallax computed by the parallax computation section, determines an operation movement ratio, for converting an operation amount, that instructs movement of the focusing lens, into a movement amount of the focusing lens, by using a function including the operation movement ratio as a dependent variable and an independent variable determined according to the factor and the parallax;
a control section that controls the movement section to move the focusing lens by an amount equivalent to the movement amount determined based on the operation movement ratio determined by the determination section and based on the operation amount;
a generation section that generates a first display image based on an image signal that is output from the image pick-up device, and generates a second display image for use in focus verification based on the first and second images;
a display section that displays images; and
a display controller that performs control to inhibit display by the display section of the first display image that is generated by the generation section, and to display on the display section the second display image that is generated by the generation section.

11. An imaging device comprising:
the image processing device of claim 1;
the image pick-up device that includes the first and second pixel groups; and
a storage section that stores images that are generated based on image signals that are output from the image pick-up device.

12. An image processing method comprising:
acquiring first and second images, based on first and second image signals that are output from an image pick-up device that includes first and second pixel groups that output the first and second image signals due to respective images being formed by a pupil-divided subject-image that has passed through first and second regions of an imaging lens that includes a focusing lens that is moveable along an optical axis direction;
computing parallax indicating a displacement amount between each pixel in the acquired first image and each respective corresponding pixel in the acquired second image;
determining, based on a factor defining a depth representing a permissible range for an acceptable state of focus and based on the computed parallax, an operation movement ratio for converting an operation amount, that instructs movement of the focusing lens, into a movement amount of the focusing lens, by using a function including the operation movement ratio as a dependent variable and an independent variable determined according to the factor and the parallax;
controlling a movement section that moves the focusing lens, to move the focusing lens by an amount equivalent to the movement amount determined based on the determined operation movement ratio and based on the operation amount;
generating a first display image based on an image signal output from the image pick-up device;
generating a second display image, for use in focus verification, based on the first and second images; and
performing control to display the generated first display image on a display section for displaying images, and to display the generated second display image within a display region of the first display image.

13. An image processing method comprising:
acquiring first and second images, based on first and second image signals that are output from an image pick-up device that includes first and second pixel groups that output the first and second image signals due to respective images being formed by a pupil-divided subject-image that has passed through first and second regions of an imaging lens that include a focusing lens that is moveable along an optical axis direction;
computing parallax indicating a displacement amount between each pixel in the acquired first image and each respective corresponding pixel in the acquired second image;
determining, based on a factor defining a depth representing a permissible range for an acceptable state of focus and based on the computed parallax, an operation movement ratio for converting an operation amount, that instructs movement of the focusing lens, into a movement amount of the focusing lens, by using a function including the operation movement ratio as a dependent variable and an independent variable determined according to the factor and the parallax;
controlling a movement section that moves the focusing lens, to move the focusing lens by an amount equivalent to the movement amount determined based on the determined operation movement ratio and based on the operation amount;
generating a first display image based on an image signal output from the image pick-up device;
generating a second display image, for use in focus verification, based on the first and second images; and
performing control to inhibit display by a display section of the generated first display image, and to display on the display section the generated second display image.

14. A non-transitory computer-readable storage medium storing a program for causing a computer to function as the image acquisition section, the parallax computation section, the determination section, the control section, the generation section, and the display control section of the image processing device of claim 1.

* * * * *